United States Patent
Miyasako et al.

(10) Patent No.: US 7,607,288 B2
(45) Date of Patent: Oct. 27, 2009

(54) CATALYST DETERIORATION DIAGNOSIS APPARATUS AND CATALYST DETERIORATION DIAGNOSIS METHOD FOR INTERNAL COMBUSTION ENGINE

(75) Inventors: Masakazu Miyasako, Tokyo (JP); Koji Wada, Tokyo (JP); Makoto Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 331 days.

(21) Appl. No.: 11/589,864

(22) Filed: Oct. 31, 2006

(65) Prior Publication Data

US 2007/0240403 A1  Oct. 18, 2007

(30) Foreign Application Priority Data

Apr. 18, 2006  (JP) .............................. 2006-114560

(51) Int. Cl.
*F01N 3/00* (2006.01)
(52) U.S. Cl. .......................................... 60/277; 60/285
(58) Field of Classification Search .................. 60/276, 60/277, 285, 299
See application file for complete search history.

(56) References Cited

U.S. PATENT DOCUMENTS

| | | | | |
|---|---|---|---|---|
| 5,379,587 A * | 1/1995 | Toyoda | ........................ | 60/276 |
| 5,396,766 A * | 3/1995 | Sato et al. | ...................... | 60/276 |
| 5,845,489 A * | 12/1998 | Dohta et al. | ................... | 60/276 |
| 5,875,628 A * | 3/1999 | Mitsutani | ...................... | 60/276 |
| 6,463,735 B2 * | 10/2002 | Morinaga et al. | ............. | 60/277 |
| 2003/0187568 A1 * | 10/2003 | Yasui et al. | .................. | 701/109 |
| 2004/0030485 A1 * | 2/2004 | Yasui | .......................... | 701/109 |
| 2005/0284130 A1 * | 12/2005 | Takubo et al. | ................. | 60/285 |

FOREIGN PATENT DOCUMENTS

JP  05-098949 A  4/1993
JP  07-305623 A  11/1995

* cited by examiner

*Primary Examiner*—Thomas E Denion
*Assistant Examiner*—Jonathan Matthias
(74) *Attorney, Agent, or Firm*—Sughrue Mion, PLLC

(57) ABSTRACT

A catalyst deterioration diagnosis apparatus for an internal combustion engine, comprising means for subjecting output signals of an upstream-side and a downstream-side $O_2$ sensors to weighted correction processes corresponding to output levels, means for calculating amplitude magnitudes of the output signals of the upstream-side and the downstream-side $O_2$ sensors after the weighted correction processes, and time integral values of differences between predetermined signals and the output signals of the upstream-side and downstream-side $O_2$ sensors after the weighted correction processes, means for calculating a deterioration diagnosing parameter on the basis of the amplitude magnitudes and the time integral values, means for deciding deterioration of a catalyst converter on the basis of a result of a comparison between the calculated deterioration diagnosing parameter and a predetermined deterioration decision threshold value, and warning means for issuing warning when the catalyst deterioration has been decided.

20 Claims, 15 Drawing Sheets

CATALYST DETERIORATION DIAGNOSIS APPARATUS AND CATALYST DETERIORATION DIAGNOSIS METHOD FOR INTERNAL COMBUSTION ENGINE

BACKGROUND OF THE INVENTION

1. Field of the Invention

This invention relates to a catalyst deterioration diagnosis apparatus and a catalyst deterioration diagnosis method which diagnose the deteriorated state of a catalyst converter disposed for the exhaust gas purification of an internal combustion engine, and which gives warning to a driver.

2. Description of the Related Art

An apparatus for purifying the exhaust gas of an internal combustion engine as is extensively put into practical use is one wherein a ternary catalyst converter (hereinbelow, termed "catalyst converter" or simply "catalyst") which simultaneously oxidizes CO and HC and deoxidizes $NO_x$ is disposed in the exhaust system of the engine, while $O_2$ sensors are respectively disposed on the upstream side and downstream side of the catalyst, and an air/fuel ratio feedback control is performed in accordance with the detection signals of the $O_2$ sensors, whereby an air/fuel ratio can be controlled within a very narrow range in the vicinity of a theoretical air/fuel ratio, and the purifiability of the catalyst disposed in the exhaust system can be held high.

In a case where the catalyst has had its purification efficiency lowered gradually or has been destroyed by the heat of the exhaust gas, sulfur poisoning, or the like, a vehicle in which the engine is installed travels while emitting harmful components, and it is accordingly desirable to take a measure such as the exchange of the catalyst. The driver of the vehicle, however, is difficult of sensing the deterioration or destruction of the catalyst.

In this regard, a catalyst deterioration detection apparatus for an internal combustion engine as proposed in JP-A-5-98949 (Patent Document 1) and a catalyst deterioration diagnosis apparatus proposed in JP-A-7-305623 (Patent Document 2), for example, have been known as apparatuses for deciding (diagnosing) such a deteriorated state of the catalyst.

Each of the apparatuses proposed in the patent documents executes the air/fuel ratio feedback control in accordance with the output signals of the $O_2$ sensors which are respectively disposed on the upstream side and downstream side of the catalyst interposed in the exhaust passage of the internal combustion engine, and it diagnoses the deteriorated state of the catalyst by comparing the output signals of both the $O_2$ sensors.

FIGS. 13A-13E are graphs showing the "output waveforms of the upstream-side $O_2$ sensor and downstream-side $O_2$ sensor during the air/fuel ratio feedback control" in the internal combustion engine in the related art.

During the execution of the air/fuel ratio feedback control, a fuel feed quantity is controlled (in other words, feedback-corrected) by, for example, a proportional and integral control shown in FIG. 13A, chiefly on the basis of the output signal of the upstream-side $O_2$ sensor.

Accordingly, the output signal of the upstream-side $O_2$ sensor cyclically repeats the inversion of rich and lean states with respect to "rich"/"lean" decision voltage as shown in FIG. 13B.

In contrast, on the downstream side of the catalyst, the fluctuation of a remaining oxygen concentration becomes very gentle owing to the $O_2$ storage capability of the catalyst. As shown in FIG. 13C, therefore, the output signal of the downstream-side $O_2$ sensor has a smaller fluctuating width and a longer fluctuating cycle as compared with that of the upstream-side $O_2$ sensor.

However, when the catalyst has been deteriorated, oxygen concentrations do not become considerably different between on the upstream side and downstream side of the catalyst, on account of the lowering of the $O_2$ storage capability.

As a result, as shown in FIGS. 13D and 13E, the output signal of the downstream-side $O_2$ sensor comes to repeat inversion with a cycle approximate to that of the output signal of the upstream-side $O_2$ sensor, in accordance with the degree of the deterioration of the catalyst, and it comes to exhibit a larger fluctuating width.

In order to cope with the situation, the catalyst deterioration detection apparatus for an internal combustion engine as disclosed in JP-A-5-98949 includes means for calculating the areas of patterns which are enclosed with the output signals of $O_2$ sensors disposed on the upstream side and downstream side of a catalyst and predetermined signals (that is, the time integral values of the differences between the output signals of the $O_2$ sensors disposed on the upstream side and downstream side and the predetermined signals), means for calculating cycles at which the outputs of the $O_2$ sensors on the upstream side and downstream side are inverted with respect to the predetermined signals, means for calculating the deterioration decision parameter of the catalyst by using the calculated time integral values, the inversion cycle, or the combination of them, deterioration decision means for comparing the deterioration decision parameter with a predetermined value so as to decide the deterioration of the catalyst, and warning means for issuing warning in case of the decision of the deterioration.

Besides, the catalyst deterioration diagnosis apparatus for an internal combustion engine as disclosed in JP-A-7-305623 consists in including frequency calculation means for calculating the output signal frequencies of $O_2$ sensors on the upstream side and downstream side of a catalyst, respectively, and means for subjecting the output signal of the downstream-side $O_2$ sensor to filter processing on the basis of the frequency of the output signal of the upstream-side $O_2$ sensor, wherein the influence of that fluctuation of a low frequency which is attendant upon the deviation between a target air/fuel ratio and a theoretical air/fuel ratio and which occurs in accordance with the running condition of the internal combustion engine, is suppressed by employing the amplitude ratio or number-of-times-of-inversion ratio between the output signal of the downstream-side $O_2$ sensor subjected to the filter processing and the output signal of the upstream-side $O_2$ sensor before the filter processing, thereby to prevent an erroneous diagnosis in the case of a catalyst deterioration diagnosis.

As stated before, in order to hold the purifiability of the catalyst high, the air/fuel ratio needs to be controlled into the very narrow range in the vicinity of the theoretical air/fuel ratio.

Especially, the upstream-side $O_2$ sensor is directly influenced by the heat of the exhaust gas or the sulfur poisoning, and it is therefore liable to undergo the lowering of a response rate and the lowering of an output voltage due to the deterioration.

In general, therefore, the output signal of the downstream-side $O_2$ sensor is employed, not only for the catalyst deterioration diagnosis, but also for the correction of the bias of the whole air/fuel ratio for the air/fuel ratio feedback control based on the output signal of the upstream-side $O_2$ sensor, and so forth.

More specifically, the rich/lean decision voltage on the upstream side is corrected in accordance with the deviation between the output of the downstream-side $O_2$ sensor and a downstream-side target voltage, whereby the influence of the deterioration of the upstream-side $O_2$ sensor is compensated, and the air/fuel ratio is controlled into a state capable of holding the purifiability of the catalyst high.

FIG. 14 is a graph showing the output characteristic of a general $O_2$ sensor in the related art, and the output waveforms of the $O_2$ sensor during an air/fuel ratio feedback control.

As shown in FIG. 14, the output characteristic of the $O_2$ sensor is a nonlinear characteristic versus an air/fuel ratio (oxygen concentration).

It is accordingly understood that, in a case (b) where a control range has been shifted in a rich (lower oxygen concentration) direction relative to an output voltage waveform (center characteristic) in the case where the air/fuel ratio feedback control is proceeding within a certain range (a) centering round the theoretical air/fuel ratio, and in a case (c) where the control range has been shifted in a lean (excessive oxygen concentration) direction, the output voltage waveform is distorted to narrow an amplitude, in spite of the same fluctuating width of the air/fuel ratio (oxygen concentration).

FIG. 15 is a graph for explaining a problem in the related art catalyst diagnosis for an internal combustion engine.

In a case where a deviation has occurred between the output characteristics of the upstream-side and downstream-side $O_2$ sensors, under the influence of the deterioration of the $O_2$ sensor or the discrepancy of the output characteristics, the output signal amplitude "$\Delta V\_F2$" and area equivalent value "$S\_F2$" of the upstream-side $O_2$ sensor in the case where an air/fuel ratio control range on the upstream side has shifted into the rich (higher output voltage) direction become smaller as compared with the output signal amplitude "$\Delta V\_F1$" and area equivalent value "$S\_F1$" of the upstream-side $O_2$ sensor in the case where the air/fuel ratio control range is controlled in the vicinity of the theoretical air/fuel ratio, respectively, as shown in FIG. 15 by way of example.

It is therefore understood that the amplitude ratio ($\Delta V\_R1/\Delta V\_F2$) and area equivalent value ratio ($S\_R1/S\_F2$) of the $O_2$ sensor output signals on the upstream side and downstream side become larger as compared with the amplitude ratio ($\Delta V\_R1/\Delta V\_F1$) and area equivalent value ratio ($S\_R1/S\_F1$) in the case where the air/fuel ratio control range is controlled in the vicinity of the theoretical air/fuel ratio, respectively.

Accordingly, in the apparatus wherein the deteriorated state of the catalyst is diagnosed by employing the amplitude ratio or area equivalent value ratio of the $O_2$ sensor output signals on the upstream side and downstream side, or a value obtained by combining the ratios, the deteriorated state cannot be detected, or the deterioration is erroneously diagnosed, in the worst case.

By the way, in the above description, the "area equivalent value" signifies a "value which is equivalent to an area enclosed with the $O_2$ sensor output signal and a predetermined signal", and this area equivalent value is the "time integral value of the difference between the $O_2$ sensor output signal and the predetermined signal".

Besides, the "predetermined signal" signifies, for example, a "voltage level in the vicinity of the amplitude center of the output signal of the $O_2$ sensor" as indicated by a dot-and-dash line in FIG. 15.

Besides, in FIG. 15, "$S\_F1$" and "$S\_F2$" indicate the area equivalent values in the upstream-side $O_2$ sensor output, and the value "$S\_F1$" is the area equivalent value in the case where the $O_2$ sensor output is oscillating in the vicinity of the center of the $O_2$ sensor output characteristic, while the value "$S\_F2$" is the area equivalent value in the case where the $O_2$ sensor output is oscillating at a position which has shifted onto a higher voltage side from the vicinity of the center of the $O_2$ sensor output characteristic.

In general, a target voltage for the output signal of the downstream-side $O_2$ sensor is set so as to establish an air/fuel ratio state capable of holding the purifiability of the catalyst high, in accordance with the running condition of the internal combustion engine. In some cases, however, the target voltage is controlled in a region which is slightly shifted into the rich or lean direction relative to the theoretical air/fuel ratio.

As a result, in a case where an air/fuel ratio feedback control has been performed in a range in which the amplitude of an output voltage becomes small with respect to the output characteristic of the $O_2$ sensor, the absolute value of the amplitude or area equivalent value of an $O_2$ sensor output to be obtained becomes smaller as compared with a case where the air/fuel ratio feedback control is proceeding in a range centering round the theoretical air/fuel ratio.

Therefore, the amplitude ratio or area equivalent value ratio of the $O_2$ sensor output signals on the upstream side and downstream side, or the value obtained by combining the ratios fluctuates greatly due to the slight deviation of the $O_2$ sensor output characteristics on the upstream side and downstream side, and robustness against the erroneous diagnosis cannot be satisfactorily ensured under such a running condition in some cases.

Incidentally, the word "robust" is used in the significance that "control specifications are always satisfied however the features of a controlled system may fluctuate" in the field of control engineering.

Here, the word "robust" signifies an "immunity or strength" which prevents the erroneous diagnosis even in a case where the detection or diagnosis apparatus has undergone a disturbance such as the change of the running state of the internal combustion engine or the target air/fuel ratio (target voltage of the $O_2$ sensor output).

SUMMARY OF THE INVENTION

This invention has been made in order to solve such a problem, and it has for its object to provide a catalyst deterioration diagnosis apparatus and a catalyst deterioration diagnosis method for an internal combustion engine, in which even in a case where a deviation has occurred in the output characteristics of $O_2$ sensors on an upstream side and a downstream side, an appropriate amplitude ratio or area equivalent value ratio or an appropriate value obtained by combining the ratios as corresponds to the deteriorated state of a catalyst can be obtained, and robustness is satisfactorily ensured, whereby the deteriorated state of the catalyst can be accurately diagnosed.

A catalyst deterioration diagnosis apparatus for an internal combustion engine according to the invention consists in a catalyst deterioration diagnosis apparatus for an internal combustion engine as has a catalyst converter which is interposed in an exhaust passage of the internal combustion engine, an upstream-side $O_2$ sensor which is disposed in an upstream of the catalyst converter, a downstream-side $O_2$ sensor which is disposed in a downstream of the catalyst converter, running-state detection means for detecting that running state of the internal combustion engine which includes an engine revolution number and load information, basic-injection-quantity setting means for setting a basic fuel injection quantity in accordance with the running state information from the running-state detection means, feedback control means for executing a feedback control on the basis of a signal of the upstream-side $O_2$ sensor and for correcting the feedback control on the basis of a signal of the downstream-side $O_2$ sensor, and fuel-injection-quantity correction means for correcting the basic fuel injection quantity in accordance with a control magnitude based on the feedback control, comprising weighted correction process means for subjecting the output signal of the upstream-side $O_2$ sensor and the output signal of the downstream-side $O_2$ sensor to weighted correction processes corresponding to output levels, when it has been decided on the basis of the running state information that the running state falls within a catalyst deterioration diagnosis performance region previously set; calculation means for calculating both or either of amplitude magnitudes of the output signal of the upstream-side $O_2$ sensor and the output signal of the downstream-side $O_2$ sensor after the weighted correction processes, and time integral values of differences between predetermined signals and the output signal of the upstream-side $O_2$ sensor and the output signal of the downstream-side $O_2$ sensor after the weighted correction processes; deterioration-diagnosing-parameter calculation means for calculating a deterioration diagnosing parameter on the basis of a combination or either of the amplitude magnitudes and the time integral values calculated by the calculation means; deterioration decision means for deciding deterioration of the catalyst converter on the basis of a result of a comparison between a predetermined deterioration decision threshold value and the deterioration diagnosing parameter calculated by the deterioration-diagnosing-parameter calculation means; and warning means for issuing warning when it has been decided by the deterioration decision means that the catalyst converter has been deteriorated.

Thus, according to this invention, it is possible to provide a catalyst deterioration diagnosis apparatus for an internal combustion engine, in which even in a case where a deviation has occurred between the output characteristics of the $O_2$ sensors on the upstream side and the downstream side, an appropriate amplitude ratio or area equivalent value (time integral value) ratio corresponding to the deteriorated state of the catalyst, or a value obtained by combining the ratios can be obtained, and robustness is satisfactorily ensured, so that the deteriorated state of the catalyst converter can be accurately diagnosed.

Besides, a catalyst deterioration diagnosis method for an internal combustion engine according to this invention consists in a catalyst deterioration diagnosis method for an internal combustion engine as has a catalyst converter which is interposed in an exhaust passage of the internal combustion engine, an upstream-side $O_2$ sensor which is disposed in an upstream of the catalyst converter, a downstream-side $O_2$ sensor which is disposed in a downstream of the catalyst converter, running-state detection means for detecting that running state of the internal combustion engine which includes an engine revolution number and load information, basic-injection-quantity setting means for setting a basic fuel injection quantity in accordance with the running state information from the running-state detection means, feedback control means for executing a feedback control on the basis of a signal of the upstream-side $O_2$ sensor and for correcting the feedback control on the basis of a signal of the downstream-side $O_2$ sensor, and fuel-injection-quantity correction means for correcting the basic fuel injection quantity in accordance with a control magnitude based on the feedback control, comprising a weighted correction process step of subjecting the output signal of the upstream-side $O_2$ sensor and the output signal of the downstream-side $O_2$ sensor to weighted correction processes corresponding to output levels, when it has been decided on the basis of the running state information that the running state falls within a catalyst deterioration diagnosis performance region previously set; a calculation step of calculating both or either of amplitude magnitudes of the output signal of the upstream-side $O_2$ sensor and the output signal of the downstream-side $O_2$ sensor after the weighted correction processes, and time integral values of differences between predetermined signals and the output signal of the upstream-side $O_2$ sensor and the output signal of the downstream-side $O_2$ sensor after the weighted correction processes; a deterioration-diagnosing-parameter calculation step of calculating a deterioration diagnosing parameter on the basis of a combination or either of the amplitude magnitudes and the time integral values calculated at the calculation step; a deterioration decision step of deciding deterioration of the catalyst converter on the basis of a result of a comparison between a predetermined deterioration decision threshold value and the deterioration diagnosing parameter calculated at the deterioration-diagnosing-parameter calculation step; and a warning step of issuing warning when it has been decided at the deterioration decision step that the catalyst converter has been deteriorated.

Thus, according to this invention, it is possible to provide a catalyst deterioration diagnosis method for an internal combustion engine, in which even in a case where a deviation has occurred between the output characteristics of the $O_2$ sensors on the upstream side and the downstream side, an appropriate amplitude ratio or area equivalent value (time integral value) ratio corresponding to the deteriorated state of the catalyst, or a value obtained by combining the ratios can be obtained, and robustness is satisfactorily ensured, so that the deteriorated state of the catalyst converter can be accurately diagnosed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A through 13E are graphs for explaining the output waveforms of an upstream-side $O_2$ sensor and a downstream-side $O_2$ sensor during an air/fuel ratio feedback control in an internal combustion engine in the related art;

DETAILED DESCRIPTION OF THE INVENTION

Now, embodiments of this invention will be described in conjunction with the drawings.

Incidentally, throughout flow charts for explaining operations, identical processing step numbers represent identical or equivalent processing steps.

EMBODIMENT 1

Figure 1:
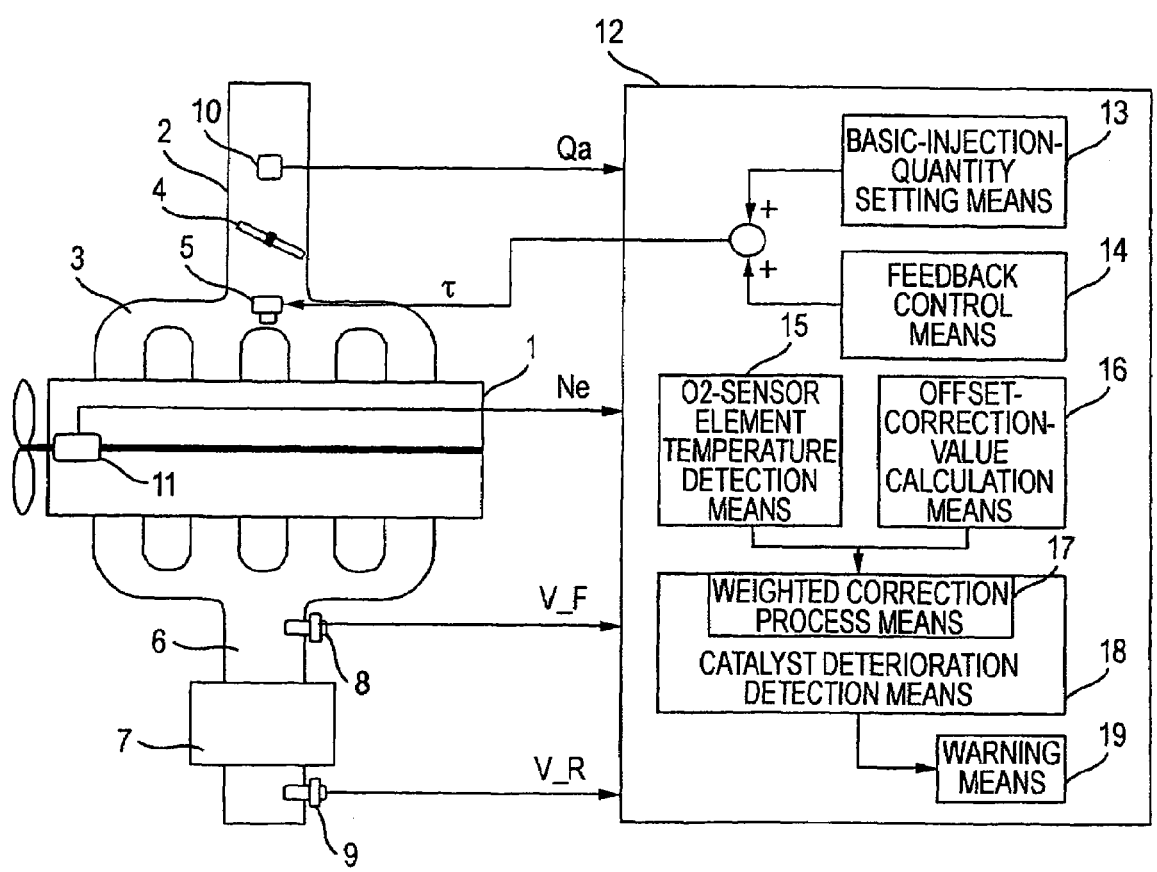
FIG. 1 is a block diagram conceptually showing the configuration of a catalyst deterioration diagnosis apparatus for an internal combustion engine according to this invention.

FIG. 1 is a block diagram conceptually showing the configuration of a catalyst deterioration diagnosis apparatus for an internal combustion engine according to this invention.

As shown in the figure, in the catalyst deterioration diagnosis apparatus for the internal combustion engine according to this embodiment, a catalyst converter (simply termed "catalyst") 7 made of a ternary catalyst is interposed in the exhaust pipe 6 of the engine 1.

Besides, an upstream-side $O_2$ sensor 8 and a downstream-side $O_2$ sensor 9 are respectively disposed in the upstream and downstream of the catalyst 7.

Both the upstream-side $O_2$ sensor 8 and the downstream-side $O_2$ sensor 9 generate electromotive forces (hereinbelow, termed "output voltages") which correspond to remaining oxygen concentrations in exhaust gas.

Figure 14:
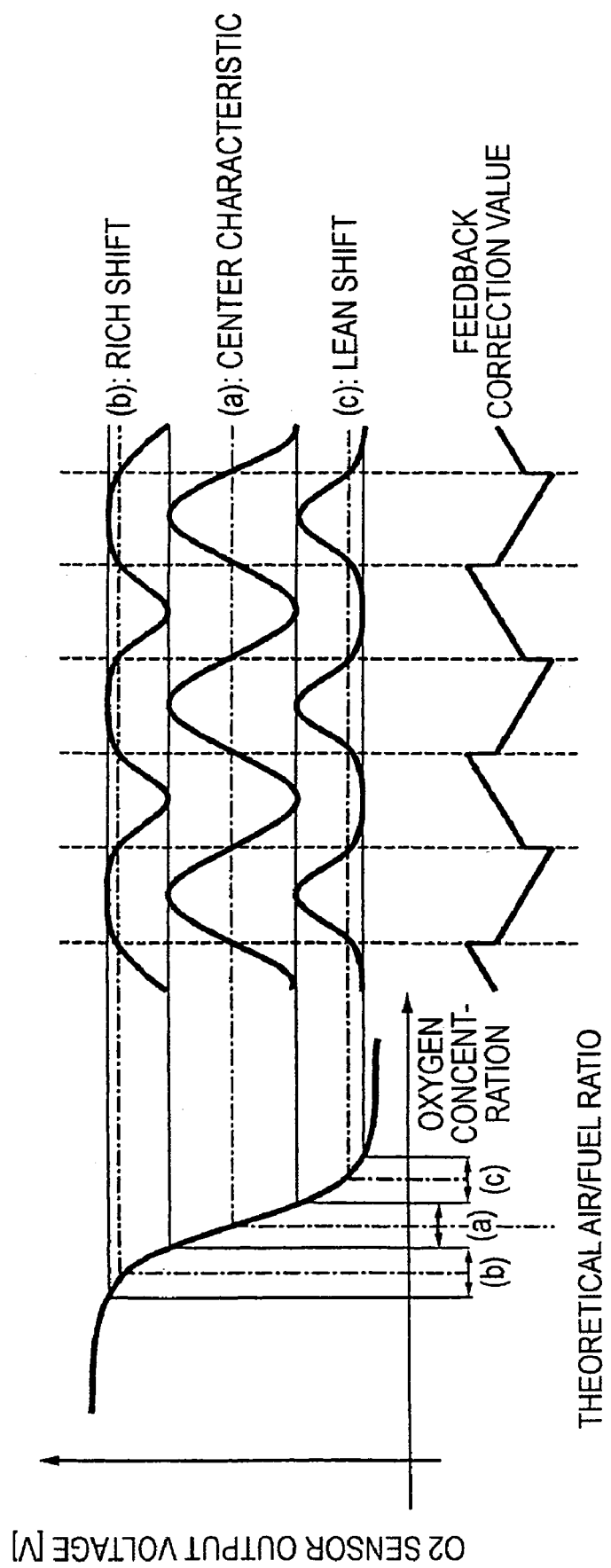
FIG. 14 is a graph showing the output characteristic of a general $O_2$ sensor in the related art and the output waveforms of the $O_2$ sensor during an air/fuel ratio feedback control.
Figure 15:
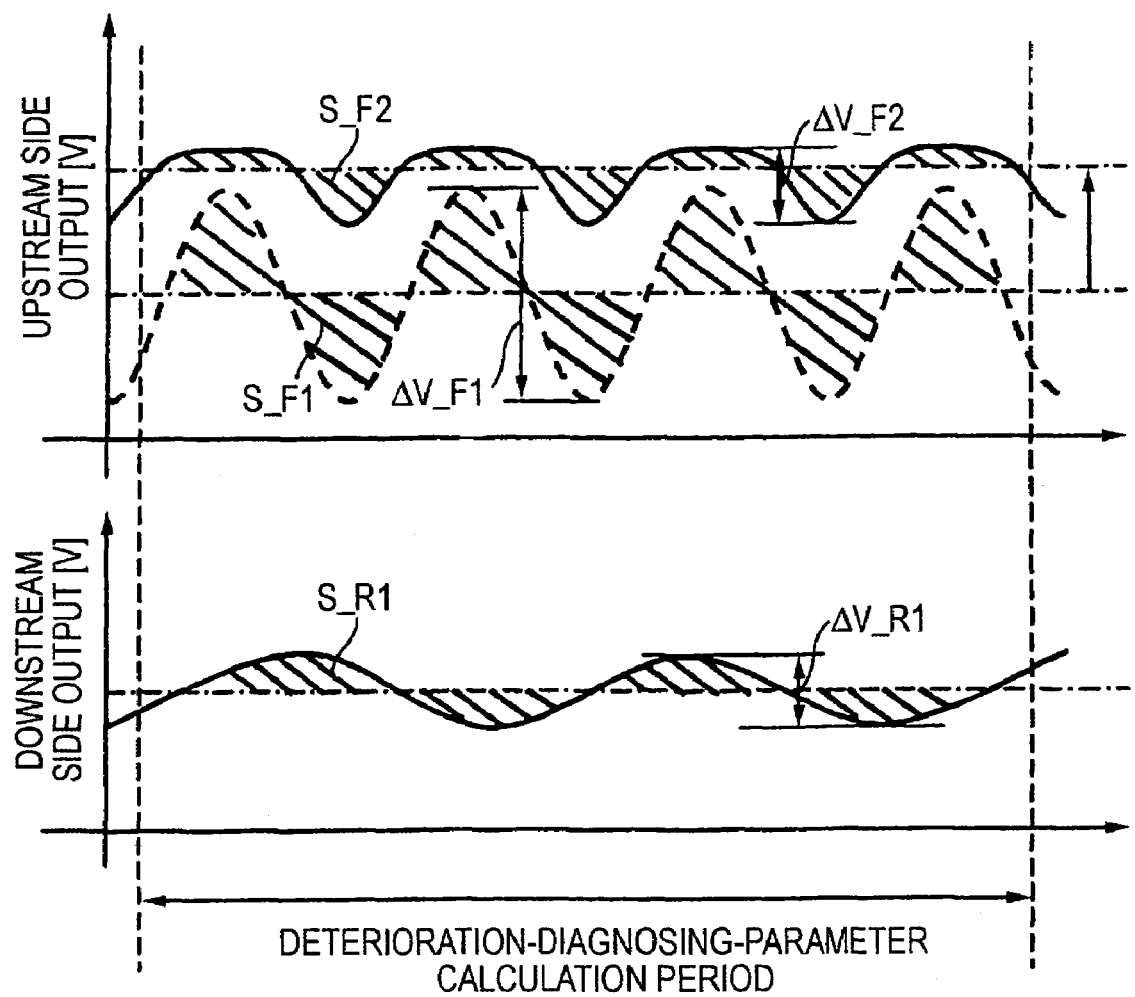
FIG. 15 is a graph for explaining a problem in a related art catalyst deterioration diagnoisis for an internal combustion engine.

As shown in FIG. 14, regarding the upstream-side $O_2$ sensor 8 and the downstream-side $O_2$ sensor 9, the output voltages abruptly change especially with a boundary at a theoretical air/fuel ratio, and these output voltages become high levels (about 1 V) on a rich (namely, lower oxygen concentration) side with respect to the theoretical air/fuel ratio.

In contrast, the output voltages become low levels (about 100 mV) on a lean (namely, excessive oxygen concentration) side.

In this manner, the upstream-side $O_2$ sensor 8 produces a sensor output "V_F" corresponding to the remaining oxygen concentration on the upstream side of the catalyst 7, while the downstream-side $O_2$ sensor 9 produces a sensor output "V_R" corresponding to the remaining oxygen concentration on the downstream side of the catalyst 7.

On the other hand, a suction air quantity Qa is adjusted by manipulating a throttle valve 4 disposed in the suction pipe 2 of the engine 1, and the suction air quantity Qa is detected by an airflow sensor 10. An injector 5 for feeding fuel is disposed in the intake manifold 3 of the engine 1.

An electronic control unit 12 configured of a computer system includes basic-injection-quantity setting means 13 for calculating a basic fuel injection quantity which is calculated on the basis of, at least, the suction air quantity Qa detected by the airflow sensor 10 and an engine revolution number Ne detected by an angle sensor 11, and feedback control means 14 for subjecting a feedback control magnitude calculated on the basis of the output "V_F" of the upstream-side $O_2$ sensor 8, to a correction on the basis of the output "V_R" of the downstream-side $O_2$ sensor 9.

Incidentally, "V" represents the voltage value of the sensor output, "_F" the Front (upstream side), and "_R" the Rear (downstream side).

Besides, a fuel quantity which is to be fed by the injector 5 is adjusted in accordance with a fuel injection quantity τ which is calculated on the basis of the basic fuel injection quantity calculated by the basic-injection-quantity setting means 13 and the control magnitude calculated by the feedback control means 14, whereby an air/fuel ratio is controlled into a very narrow range near a theoretical air/fuel ratio.

Next, a catalyst deterioration diagnosing operation which is executed by catalyst deterioration detection means 18 including weighted correction process means 17, and warning means 19, will be described with reference to flow charts of FIGS. 2 and 3.

First, at a step S100, the running state of the internal combustion engine as includes load information based on, at least, the engine revolution number Ne and the suction air quantity Qa is detected. Subsequently, at a step S101, whether or not the running state falls within a predetermined catalyst deterioration diagnosis performance region set beforehand is decided on the basis of the running state information.

Incidentally, the catalyst deterioration diagnosis performance region is defined (set) by the load information based on, at least, the engine revolution number Ne and the suction air quantity Qa.

If it has been decided at the step S101 that the running state does not fall within the predetermined diagnostic region (that is, the decision is "NO"), the deterioration diagnosis process is ended and returned.

In contrast, if the running state has been decided to fall within the predetermined diagnostic region (that is, the decision is "YES"), the routine proceeds to the processing of a step S102, et seq.

At the step S102, the upstream-side $O_2$ sensor output V_F and the downstream-side $O_2$ sensor output V_R are loaded. Subsequently, at a step S103, the loaded outputs "V_F" and "V_R" are subjected to weighted correction processes by the weighted correction process means 17 (refer to FIG. 1).

The weighted correction process operation in the weighted correction process means 17 will be described with reference to the flow chart of FIG. 3.

First, at a step S200, whether or not the $O_2$ sensor output V loaded at the step S102 is greater than a preset high-output-side decision level Vth is decided.

If the decided result of the step S200 is "YES", the $O_2$ sensor output V is regarded as being a high output, and a post-weighted-correction output (an output after the weighted correction process) VC is calculated at a step S203, whereupon the weighted correction process is returned.

In contrast, if the decided result of the step S200 is "NO", the routine proceeds to a step S201, at which whether or not the $O_2$ sensor output V loaded at the step S102 is less than a preset low-output-side decision level Vtl is decided.

If the decided result of the step S201 is "YES", the $O_2$ sensor output V is regarded as being a low output, and a post-weighted-correction output VC is calculated at a step S204, whereupon the weighted correction process is returned.

In contrast, if the decided result of the step S201 is "NO", the $O_2$ sensor output V is regarded as being neither a high voltage nor a low voltage, and the routine proceeds to a step S202, at which "a post-weighted-correction output VC=the $O_2$ sensor output V" is set. Thereafter, the weighted correction process is returned.

Besides, at the step S103, the processing of the steps S200-S204 is performed for the upstream-side $O_2$ sensor output V_F and the downstream-side $O_2$ sensor output V_R, and the results are stored as a post-correction upstream-side $O_2$ sensor output VC_F and a post-correction downstream-side $O_2$ sensor output VC_R, respectively.

Figure 4:
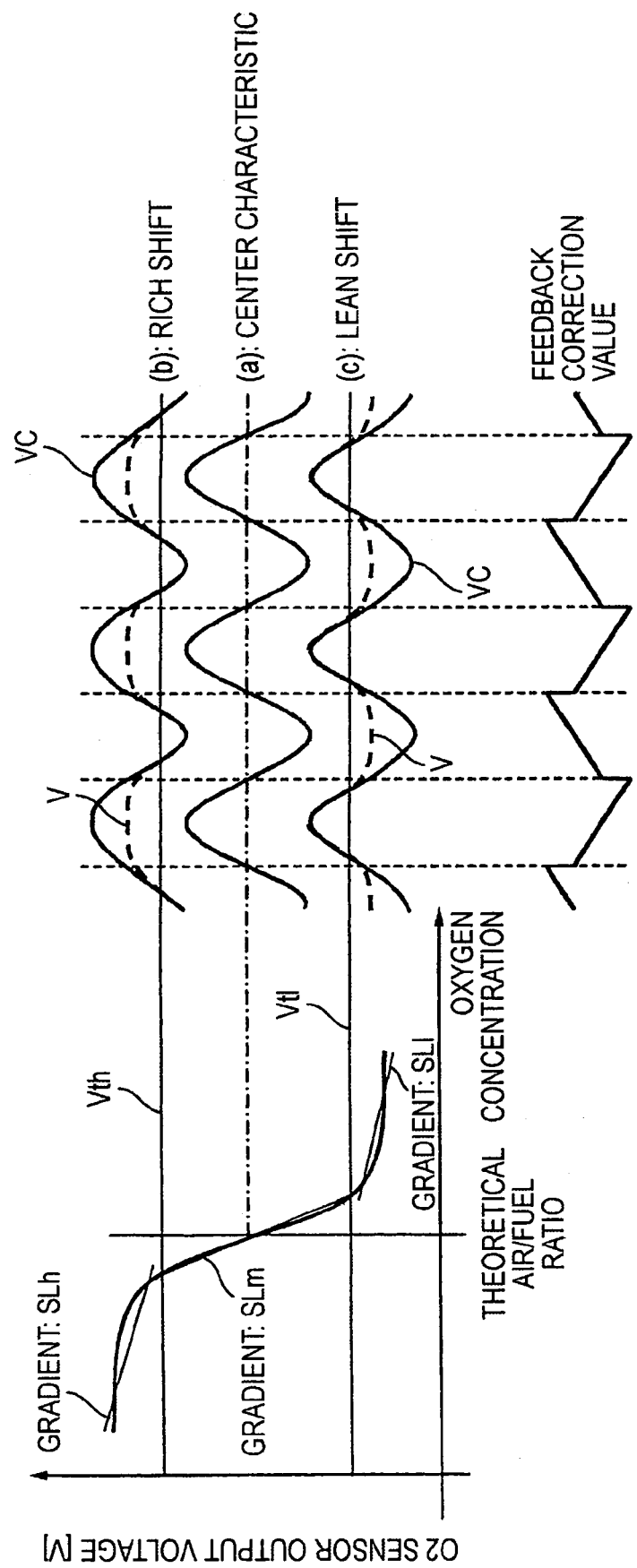
FIG. 4 is a graph showing the relations between a weighted correction process and $O_2$ sensor outputs after corrections, in Embodiment 1.

FIG. 4 is a graph showing the relations between the weighted correction process and the post-correction $O_2$ sensor outputs in Embodiment 1.

As shown in FIG. 4, the high-output-side decision level Vth and the low-output-side decision level Vtl are previously set on the basis of the output characteristic of the $O_2$ sensor so as to divide an output voltage region into a region in the vicinity of the theoretical air/fuel ratio, in which the rate of change of the output voltage versus the oxygen concentration is large, and a rich (namely, high output) region and a lean (namely, low output) region in which the rate of change of the output voltage versus the oxygen concentration becomes small.

Besides, weighted correction coefficients KH (high output side) and KL (low output side) are provided for the individual regions. The weighted correction coefficients KH and KL are calculated by Formulas (1) and (2) given below, by employing, for example, the gradients of the output characteristic versus the oxygen concentration in the corresponding regions divided by the decision levels "Vth" and "Vtl", and they are previously set, respectively.

On this occasion, the weighted correction coefficient in the region near the theoretical air/fuel ratio is set at "1" (one).

$$KH=1/(SLh/SLm) \quad (1)$$

$$KL=1/(SLl/SLm) \quad (2)$$

In this manner, corrections employing the weighted correction coefficients KH and KL are made in accordance with the high-voltage-side/low-voltage-side decision levels. Thus, as shown in FIG. 4, even in a case where the air/fuel ratio (oxygen concentration) control region has been shifted onto the rich side (b) or the lean side (c), the $O_2$ sensor output V before the correction has an amplitude which is distorted and which is small, whereas the post-correction output VC can attain an output amplitude equal to that of the center characteristic (a).

Figure 2:
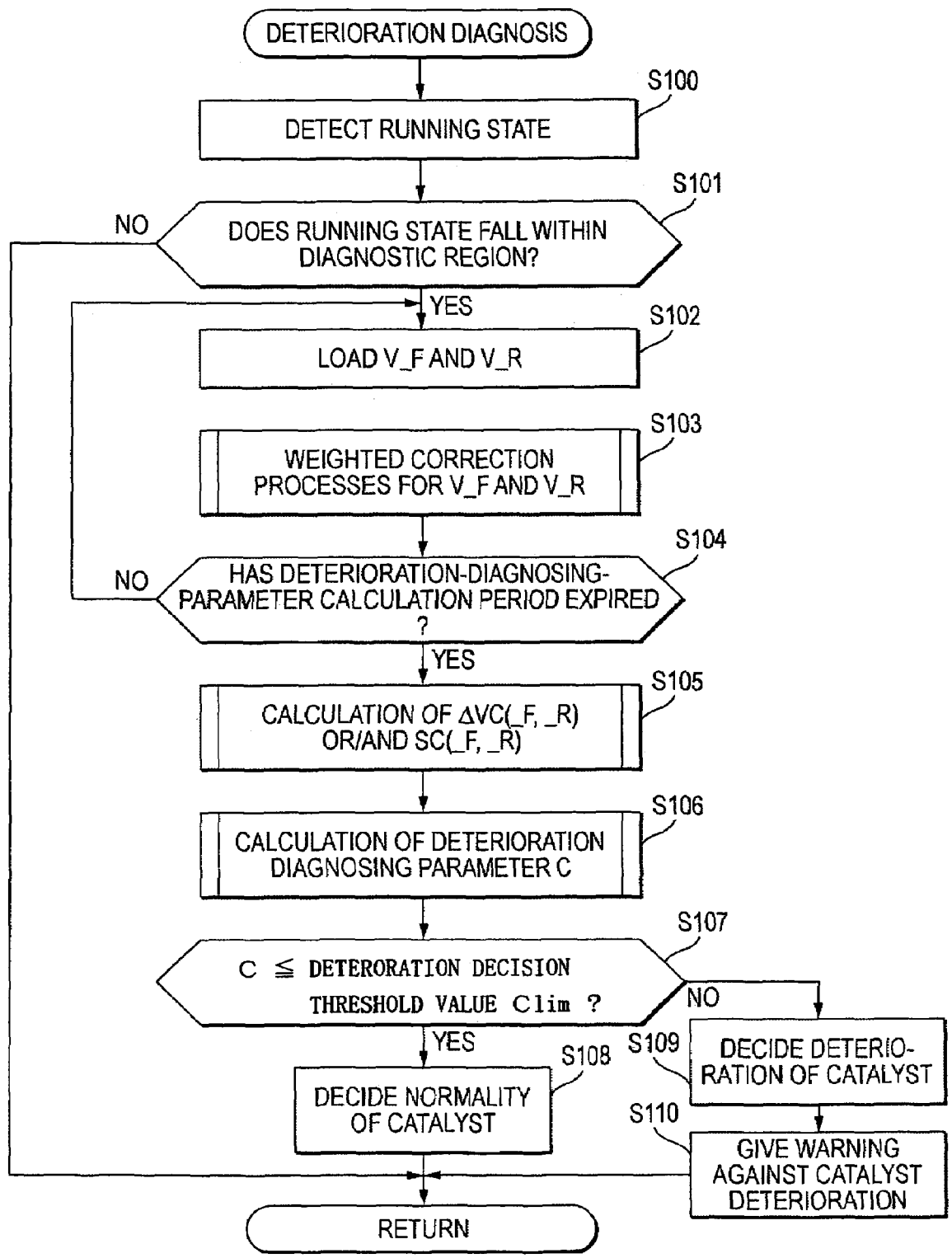
FIG. 2 is a flow chart showing a catalyst deterioration diagnosing operation in Embodiment 1.

The processing of the steps S102-S103 in FIG. 2 (including the processing of the steps S200-S204 in FIG. 3) is iteratively executed until the expiration of a predetermined period previously set is decided at a step S104. When it is decided at the step S104 that the predetermined period has expired (that is, the decided result is "YES"), the routine proceeds to a step S105.

Besides, although no illustration is made here, the deterioration diagnosis process in FIG. 2 is ended and returned in a case where, before the decision of the "expiration of the predetermined period" at the step S104, the running state of the internal combustion engine has come out of the predetermined diagnostic region defined at the step S101.

At the step S105, there are/is calculated the amplitude magnitude ΔVC of the post-correction output VC and/or an area equivalent value SC of a pattern enclosed with the post-correction output VC and a predetermined signal.

Incidentally, the "predetermined signal" signifies a "voltage level in the vicinity of the amplitude center of the $O_2$ sensor output signal" as stated before, and it is previously defined (set) in order to calculate the area equivalent value.

Besides, the "amplitude magnitude ΔVC of the post-correction output VC" and the "area equivalent value SC of the pattern enclosed with the post-correction output VC and the predetermined signal" signify the amplitude magnitude ΔVC of the post-correction output VC and the time integral value of the difference between the post-correction output VC and the predetermined signal, respectively.

Here, the amplitude magnitude ΔVC and the area equivalent value SC may well be cumulative values during a predetermined period or the mean values of respective "rich/lean" inversions during a predetermined period.

Besides, each of the amplitude magnitude ΔVC of the post-correction output VC and the area equivalent value SC of the pattern enclosed with the post-correction output VC and the predetermined signal is calculated for an upstream-side post-correction output VC_F and a downstream-side post-correction output VC_R, and the calculated results are respectively stored as amplitude magnitudes ΔVC_F and ΔVC_R and area equivalent values SC_F and SC_R.

Subsequently, at a step S106, a deterioration diagnosing parameter C is calculated by a process routine not shown, by employing the amplitude magnitudes ΔVC_F and ΔVC_R and the area equivalent values SC_F and SC_R stored at the step S105.

Here, the deterioration diagnosing parameter C is calculated as the amplitude ratio (ΔVC_R/ΔVC_F) or area equivalent value ratio (SC_R/SC_F) of the $O_2$ sensor output signals on the upstream side and downstream side, or a value obtained by combining the ratios.

At a step S107, the deterioration diagnosing parameter C calculated at the step S106 is compared with a preset deterioration decision threshold value Clim. When the deterioration diagnosing parameter C is decided to be equal to or less than the deterioration decision threshold value Clim (that is, the decided result of the step S107 is "YES"), it is decided at a step S108 that the catalyst is normal, and the deterioration diagnosis process in FIG. 2 is ended and returned.

In contrast, when the deterioration diagnosing parameter C is decided to be greater than the deterioration decision threshold value Clim (that is, the decided result is "NO"), it is decided at a step S109 that the catalyst has been deteriorated, and the routine proceeds to a step S110 at which a signal is sent to the warning means 19 so as to issue warning.

Figure 3:
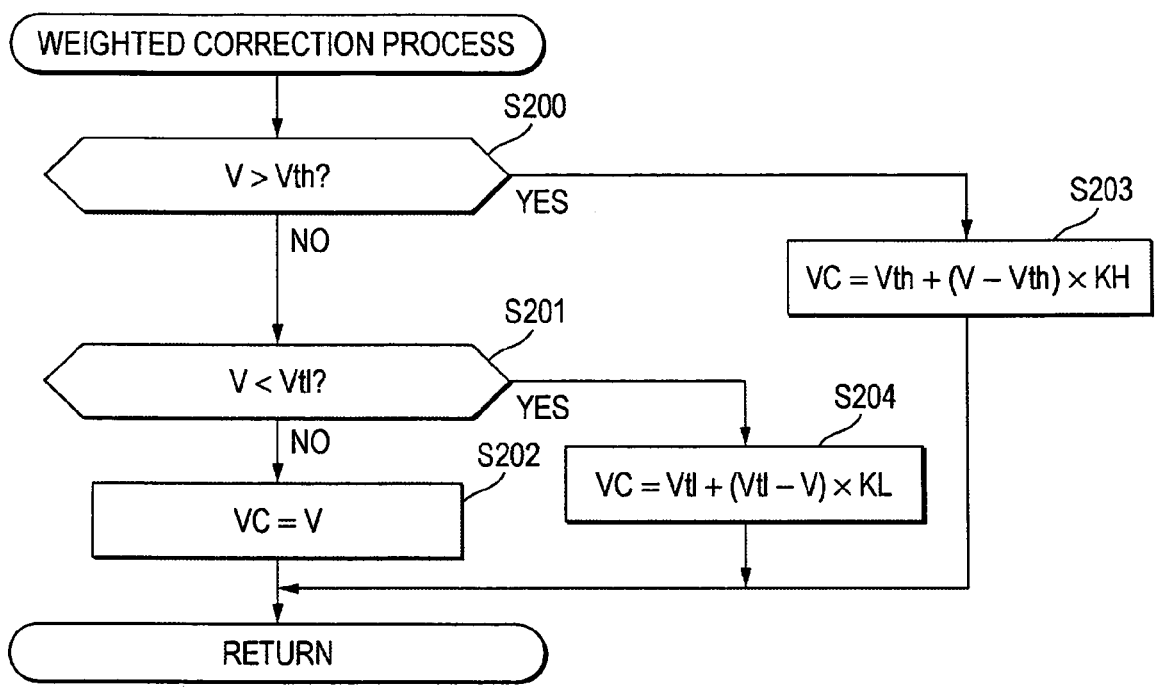
FIG. 3 is a flow chart showing a weighted correction process routine in Embodiment 1.

As described above, in the weighted correction process means 17 and at the step S105 in FIG. 2, the amplitude magnitudes (ΔVC_F, ΔVC_R) and the area equivalent values (SC_F, SC_R) are calculated for the upstream-side $O_2$ sensor output V_F and the downstream-side $O_2$ sensor output V_R, on the basis of the post-correction outputs VC_F and VC_R corrected in accordance with the output level decision results at the steps S200 and S201 in FIG. 3.

Thus, wherever the air/fuel ratio feedback control may be proceeding in the regions of the output characteristics of the $O_2$ sensors, the amplitude magnitudes (ΔVC_F, ΔVC_R) and the area equivalent values (SC_F, SC_R) can be obtained as substantially constant values versus the control magnitude.

Accordingly, the deterioration diagnosing parameter C which is calculated at the step S106 and which is obtained as the amplitude ratio (ΔVC_R/ΔVC_F) or area equivalent value ratio (SC_R/SC_F) of the $O_2$ sensor output signals on the upstream side and downstream side, or the value obtained by combining the ratios, is permitted to afford an accurate value corresponding to the deteriorated state of the catalyst, and the deteriorated state of the catalyst can be accurately diagnosed, even in the case where the deviation has occurred between the output characteristics of the upstream-side and downstream-side $O_2$ sensors, under the influence of the deterioration of the $O_2$ sensor or the discrepancy of the output characteristics.

Besides, even in the running region where the air/fuel ratio is controlled in the rich or lean state relative to the theoretical air/fuel ratio, the amplitude magnitudes (ΔVC_F, ΔVC_R) and area equivalent values (SC_F, SC_R) which are equal to those in the case where the air/fuel ratio is controlled in correspondence with the theoretical air/fuel ratio can be obtained, so that robustness against an erroneous diagnosis is satisfactorily ensured without limiting the diagnostic region, and the precision of the catalyst deterioration diagnosis can be enhanced.

Incidentally, although the weighted correction coefficients KH and KL have been set as constants at the steps S203 and S204 in FIG. 3, they may well be set as map data corresponding to, for example, the $O_2$ sensor outputs (V_F, V_R).

As thus far described, the catalyst deterioration diagnosis apparatus for an internal combustion engine according to this embodiment consists in a catalyst deterioration diagnosis apparatus for an internal combustion engine as has a catalyst converter 7 which is interposed in the exhaust passage 6 of the internal combustion engine, an upstream-side $O_2$ sensor 8 which is disposed in the upstream of the catalyst converter 7, a downstream-side $O_2$ sensor 9 which is disposed in the downstream of the catalyst converter 7, running-state detection means for detecting that running state of the internal combustion engine which includes an engine revolution number and load information, basic-injection-quantity setting means 13 for setting a basic fuel injection quantity in accordance with the running state information from the running-state detection means, feedback control means 14 for executing a feedback control on the basis of the signal of the upstream-side $O_2$ sensor 8 and for correcting the feedback control on the basis of the signal of the downstream-side $O_2$ sensor 9, and fuel-injection-quantity correction means for correcting the basic fuel injection quantity in accordance with a control magnitude based on the feedback control 14, comprising weighted-correction process means 17 for subjecting the output signal of the upstream-side $O_2$ sensor 8 and the output signal of the downstream-side $O_2$ sensor 9 to weighted correction processes corresponding to output levels, when the running state of the engine has been decided on the basis of the running state information as being a preset catalyst-deterioration-diagnosis performance region, calculation means for calculating both or either of the amplitude magnitudes of the output signal of the upstream-side $O_2$ sensor 8 and the output signal of the downstream-side $O_2$ sensor 9 after the weighted correction processes and the time integral values of the differences between predetermined signals and the output signals of the upstream-side $O_2$ sensor 8 and downstream-side $O_2$ sensor 9 after the weighted correction processes, deterioration-diagnosing-parameter calculation means for calculating a deterioration diagnosing parameter on the basis of either or the combination of the amplitude magnitudes and time integral values calculated by the calculation means, deterioration decision means for deciding the deterioration of the catalyst converter 7 on the basis of the result of the comparison between the deterioration diagnosing parameter calculated by the deterioration-diagnosing-parameter calculation means and a predetermined deterioration decision threshold value, and warning means 19 for issuing warning in a case where the catalyst converter has been decided by the deterioration decision means as having been deteriorated.

According to this embodiment, therefore, it is possible to provide the catalyst deterioration diagnosis apparatus for the internal combustion engine, in which even in a case where a deviation has occurred between the output characteristics of the upstream-side and downstream-side $O_2$ sensors, an appropriate amplitude ratio or time integral value ratio corresponding to the deteriorated state of the catalyst, or a value obtained by combining the ratios can be obtained, and robustness is satisfactorily ensured, whereby the deteriorated state of the catalyst can be accurately diagnosed.

Besides, a catalyst deterioration diagnosis method for an internal combustion engine according to this embodiment consists in a catalyst deterioration diagnosis method for an internal combustion engine as has a catalyst converter 7 which is interposed in the exhaust passage 6 of the internal combustion engine, an upstream-side $O_2$ sensor 8 which is disposed in the upstream of the catalyst converter 7, a downstream-side $O_2$ sensor 9 which is disposed in the downstream of the catalyst converter 7, running-state detection means for detecting that running state of the internal combustion engine which includes an engine revolution number and load information, basic-injection-quantity setting means 13 for setting a basic fuel injection quantity in accordance with the running state information from the running-state detection means, feedback control means 14 for executing a feedback control on the basis of the signal of the upstream-side $O_2$ sensor 8 and for correcting the feedback control on the basis of the signal of the downstream-side $O_2$ sensor 9, and fuel-injection-quantity correction means for correcting the basic fuel injection quantity in accordance with a control magnitude based on the feedback control 14, comprising a weighted-correction process step of subjecting the output signal of the upstream-side $O_2$ sensor 8 and the output signal of the downstream-side $O_2$ sensor 9 to weighted correction processes corresponding to output levels, when the running state of the engine has been decided on the basis of the running state information as being a preset catalyst-deterioration-diagnosis performance region, a calculation step of calculating both or either of the amplitude magnitudes of the output signal of the upstream-side $O_2$ sensor 8 and the output signal of the downstream-side $O_2$ sensor 9 after the weighted correction processes and the time integral values of the differences between predetermined signals and the output signals of the upstream-side $O_2$ sensor 8 and downstream-side $O_2$ sensor 9 after the weighted correction processes, a deterioration-diagnosing-parameter calculation step of calculating a deterioration diagnosing parameter on the basis of either or the combination of the amplitude magnitudes and time integral values calculated at the calculation step, a deterioration decision step of deciding the deterioration of the catalyst converter 7 on the basis of the result of the comparison between the deterioration diagnosing parameter calculated at the deterioration-diagnosing-parameter calculation step and a predetermined deterioration decision threshold value, and a warning step of issuing warning in a case where the catalyst converter has been decided at the deterioration decision step as having been deteriorated.

According to this embodiment, therefore, it is possible to provide the catalyst deterioration diagnosis method for the internal combustion engine, in which even in a case where a deviation has occurred between the output characteristics of the upstream-side and downstream-side $O_2$ sensors, an appropriate amplitude ratio or time integral value ratio corresponding to the deteriorated state of the catalyst, or a value obtained by combining the ratios can be obtained, and robustness is satisfactorily ensured, whereby the deteriorated state of the catalyst can be accurately diagnosed.

EMBODIMENT 2

Figure 5:
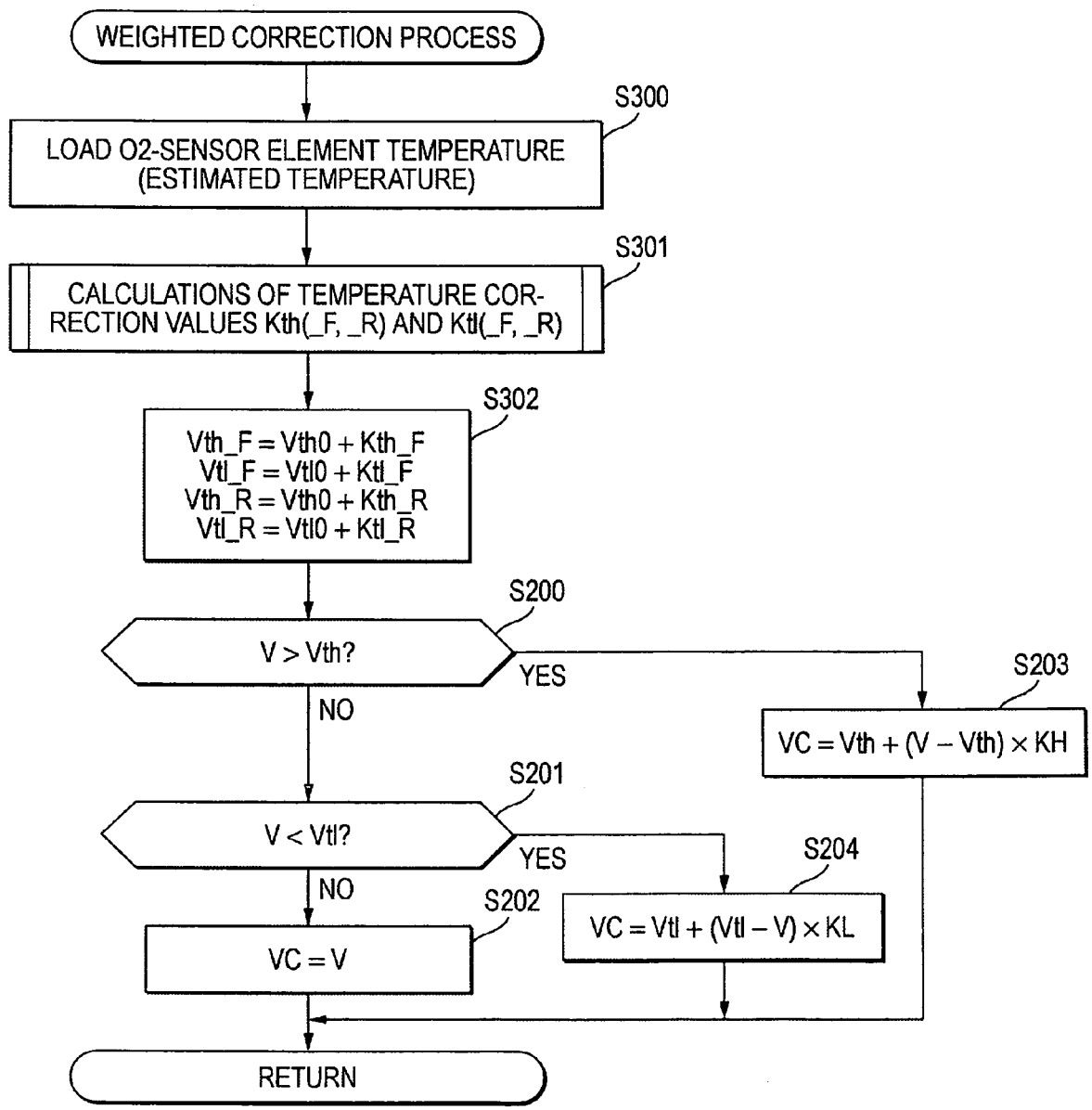
FIG. 5 is a flow chart showing a weighted correction process routine in Embodiment 2.

FIG. 5 is a flow chart showing a weighted correction process routine in a catalyst deterioration diagnosis apparatus for an internal combustion engine according to Embodiment 2 of this invention.

Embodiment 2 will be described with reference to the flow charts of FIG. 2 and FIG. 5.

In this embodiment, a weighted correction process is performed by the process routine shown in the flow chart of FIG. 5, in the weighted correction process means 17 shown in FIG. 1.

In the flow chart of FIG. 5, the processing of steps S300-S302 is added to the flow chart of FIG. 3. First, at the step S300, there are loaded $O_2$ sensor element temperatures on the upstream side and the downstream side as are obtained by the $O_2$ sensor element temperature detection means 15 (refer to FIG. 1).

Incidentally, although no detailed description is made here, the $O_2$ sensor element temperatures which are detected by the $O_2$-sensor element temperature detection means 15 are actual measurement values or estimated temperatures based on exhaust temperatures or the likes, and the exhaust temperatures may well be actual measurement values or estimated temperatures based on the running state of the engine or the cumulative value of the suction air quantity Qa.

Besides, in a case where each $O_2$ sensor has a heater function, the $O_2$ sensor element temperature may well be an estimated temperature in which the cumulative time period of heater drive is considered.

Figure 6A:
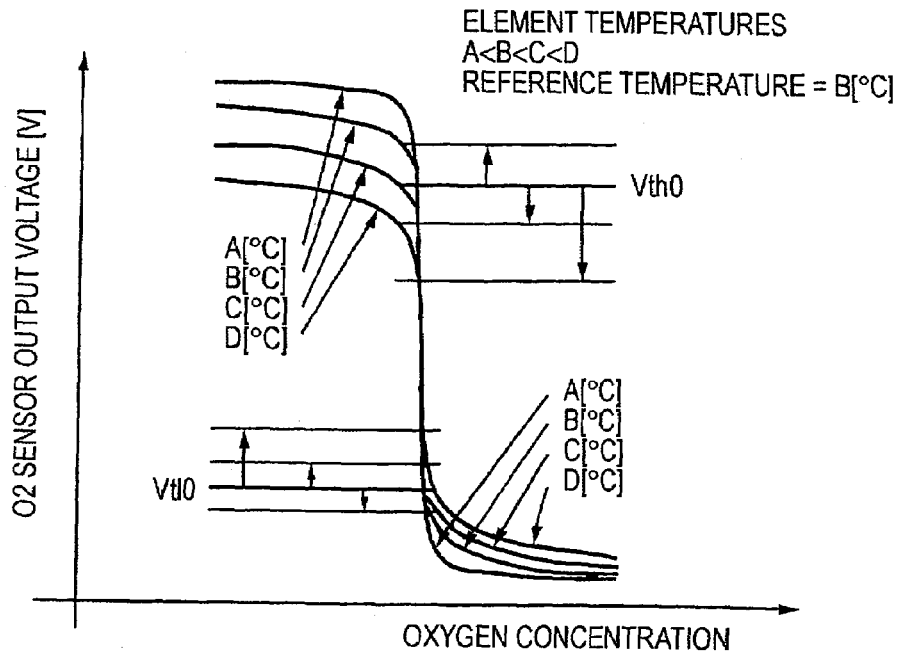
FIGS. 6A and 6B are graphs showing the relations of output characteristics and temperature correction values to the element temperatures of an $O_2$ sensor.
Figure 6B:
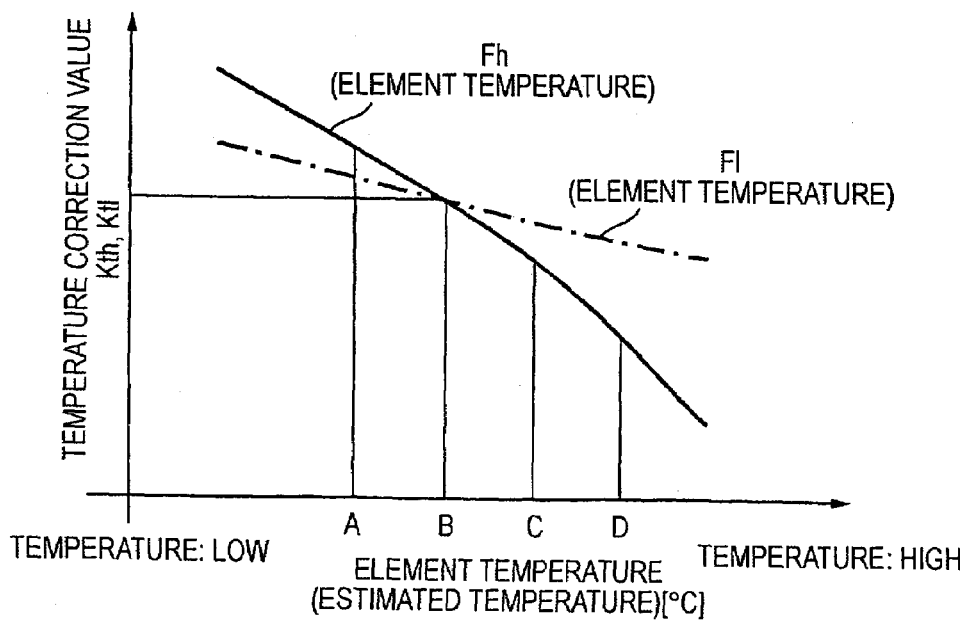

FIGS. 6A and 6B are graphs showing the relations of the output characteristic and temperature correction values (Kth, Ktl) to the element temperature of the $O_2$ sensor.

It is known that, as shown in FIG. 6A, the inflection points of the output characteristic of the $O_2$ sensor shift depending upon the element temperature.

Therefore, a high output decision level and a low output decision level at a certain reference temperature are respectively set at "Vth0" and "Vtl0", and the relations of the element temperature with the high output decision level and low output decision level are respectively prestored as functions Fh (element temperature) and Fl (element temperature) shown in FIG. 6B.

Besides, at the step S301, the temperature correction values Kth_F and Ktl_F, and Kth_R and Ktl_R are calculated in accordance with the $O_2$-sensor element temperatures on the upstream side and downstream side as have been loaded at the step S300. Subsequently, post-temperature-correction high output decision levels Vth_F and Vth_R and post-temperature-correction low output decision levels Vtl_F and Vtl_R are calculated at the step S302.

Thenceforth, as in Embodiment 1, the weighted correction process is performed by the process routine of the steps S200-S204, and the catalyst deterioration diagnosis process is performed by the process routine of the steps S104-S110 shown in FIG. 2.

In this embodiment, the high voltage decision level and low voltage decision level for deciding the output levels of the $O_2$ sensor outputs are corrected in accordance with the element temperatures of the $O_2$ sensors by the weighted correction process means 17 (that is, the output level decision zones of the signal of the upstream-side $O_2$ sensor and the signal of the downstream-side $O_2$ sensor are corrected on the basis of the $O_2$-sensor element temperatures), whereby the changes of the output characteristics of the $O_2$ sensors attributed to the element temperatures thereof are compensated, and more accurate post-correction outputs can be obtained. Accordingly, the precision of the catalyst deterioration diagnosis can be enhanced.

More specifically, the weighted correction process means 17 of the catalyst deterioration diagnosis apparatus for the internal combustion engine according to this embodiment includes the $O_2$-sensor element temperature detection means 15 for detecting or estimating the $O_2$-sensor element temperatures, and it executes the weighted correction processes after correcting the output level decision zones of the signal of the upstream-side $O_2$ sensor 8 and the signal of the downstream-side $O_2$ sensor 9 on the basis of the detected or estimated $O_2$-sensor element temperatures.

Thus, the precision of the catalyst deterioration diagnosis can be enhanced still more.

EMBODIMENT 3

Figure 7:
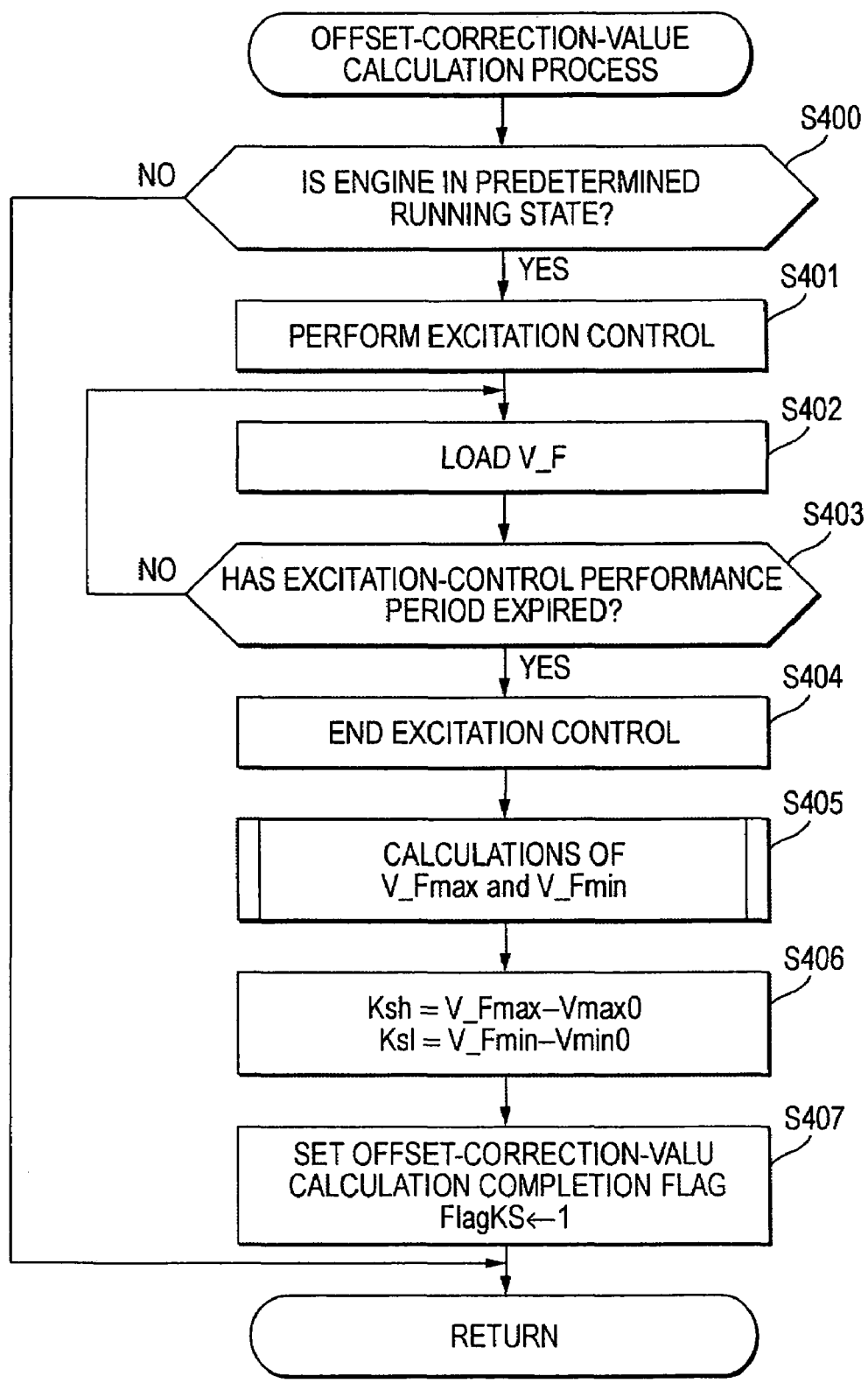
FIG. 7 is a flow chart showing an offset-correction-value calculation process routine in Embodiment 3.

FIG. 7 is a flow chart showing an offset-correction-value calculation process routine in a catalyst deterioration diagnosis apparatus for an internal combustion engine according to Embodiment 3.

Figure 8:
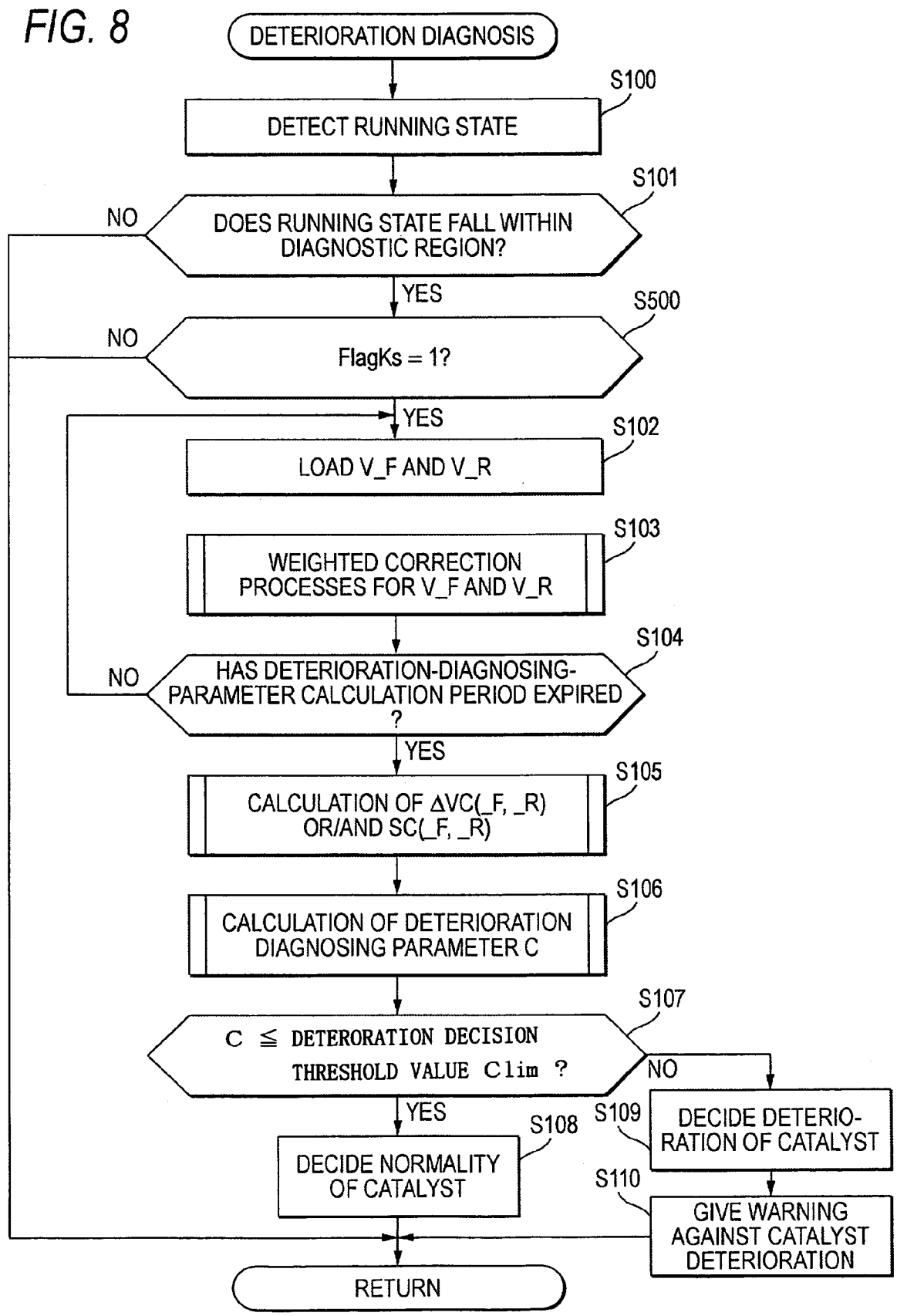
FIG. 8 is a flow chart showing a deterioration diagnosis operation in Embodiment 3.

Besides, FIG. 8 is a flow chart showing a deterioration diagnosis operation in the catalyst deterioration diagnosis apparatus for the internal combustion engine according to Embodiment 3.

Figure 9:
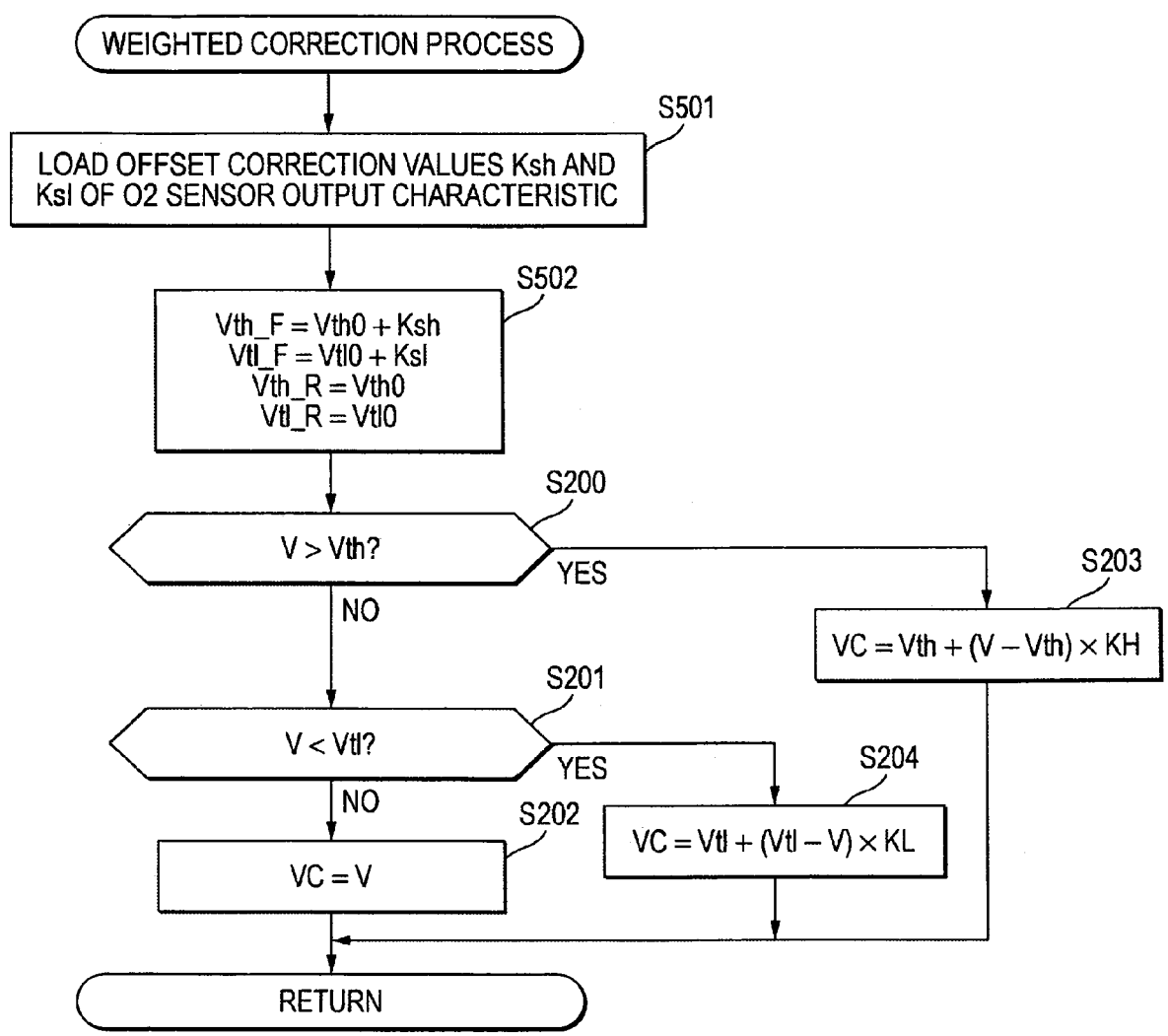
FIG. 9 is a flow chart showing a weighted correction process routine in Embodiment 3.

Besides, FIG. 9 is a flow chart showing a weighted correction process routine in the catalyst deterioration diagnosis apparatus for the internal combustion engine according to Embodiment 3.

Now, this embodiment will be described with reference to the flow charts of FIGS. 7, 8 and 9.

In this embodiment, a process for calculating an offset correction value is first executed by the process routine of the flow chart of FIG. 7 showing the operation of the offset-correction-value calculation means 16 (refer to FIG. 1).

At a step S400, it is decided whether or not the running state of the engine is a predetermined running state (for example, idle running state) in which the performance of the offset-correction-value calculation process is allowed.

If it is decided at the step S400 that the engine is not in the predetermined running state (that is, the decided result of the step S400 is "NO"), the offset-correction-value calculation process in FIG. 7 is ended and returned.

In contrast, if it is decided that the engine is in the predetermined running state (that is, the decided result is "YES"), the routine proceeds to the processing of a step S401, et seq.

At the step S401, the excitation control of an air/fuel ratio is executed with a predetermined amplitude magnitude previously set, by a process routine not shown.

The "excitation control" signifies that, as shown in FIG. 14, the $O_2$ sensor output is caused to fluctuate in both the "rich"/"lean" directions with a predetermined amplitude/cycle.

The excitation control of the air/fuel ratio is performed, for example, in such a way that a proportional gain and an integral gain in the air/fuel ratio feedback control are changed-over to predetermined values previously set.

Subsequently, an upstream-side $O_2$-sensor output voltage V_F is loaded at a step S402, and the load is iterated until the expiration of a predetermined period previously set is decided at a step S403. When it has been decided at the step S403 that the predetermined period has expired (that is, the decided result of the step S403 is "YES"), the excitation control is ended at a step S404, and the routine is returned to an ordinary air/fuel ratio feedback control so as to proceed to a step S405.

Besides, although no illustration is made here, the excitation control is ended and returned to the ordinary air/fuel ratio feedback control in a case where the running state of the engine has come out of the predetermined running state defined at the step S400, during the execution of the excitation control. Then, the offset-correction-value calculation process in FIG. 7 is ended and returned.

At the step S405, the maximum mean value and minimum mean value of respective rich/lean inversions are calculated from the upstream-side $O_2$-sensor output voltages V_F loaded during the excitation control, by a process routine not shown, and the maximum and minimum mean values are respectively stored as "V_Fmax" and "V_Fmin".

Subsequently, at a step S406, the deviations between a maximum-mean-value initial value Vmax0 and minimum-mean-value initial value Vmin0 set beforehand and the maximum mean value V_Fmax and minimum mean value V_Fmin stored at the step S405 are calculated, and they are stored as an offset correction value Ksh for a high-voltage-side decision-level initial value Vth0 and an offset correction value Ksl for a low-voltage-side decision-level initial value Vtl0, respectively. At a step S407, an offset-correction-value calculation process completion flag FlagKs is set as "1" (one), and the offset-correction-value calculation process is returned.

Next, the catalyst deterioration diagnosis operation shown in FIG. 8 will be described.

In FIG. 8, the processing of a step S500 is added to FIG. 2 showing the catalyst deterioration diagnosis process routine in Embodiment 1 or Embodiment 2. Here at the step S500, whether or not the offset-correction-value calculation process has been completed is decided depending upon whether or not the offset-correction-value calculation process completion flag FlagKs is "1".

If it is decided at the step S500 that the completion flag FlagKs is not "1" (that is, the decided result of the step S500 is "NO"), the deterioration diagnosis process shown in FIG. 8 is ended and returned.

In contrast, if the completion flag FlagKs=1 is decided (that is, the decided result is "YES"), the routine proceeds to the processing of the step S102, et seq., and the catalyst deterioration diagnosis process is continued.

Besides, in the weighted correction process means 17, a weighted correction process is performed by the process routine shown in the flow chart of FIG. 9.

Here, the processing of steps S501 and S502 is added to FIG. 3 showing the weighted correction process routine in Embodiment 1. First, at the step S501, there are loaded the offset correction value Ksh for the high-voltage-side decision-level initial value Vth0 and the offset correction value Ksl for the low-voltage-side decision-level initial value Vtl0 as have been stored in the offset-correction-value calculation process. At the step S502, post-correction values Vth_F and Vtl_F are calculated for only the high output/low output decision levels for the upstream side, and the initial values Vth0 and Vtl0 are held unchanged concerning the high output/low output decision levels Vth_R and Vtl_R for the downstream side.

Thenceforth, as in Embodiment 1 or Embodiment 2, the weighted correction process is performed by the process routine of the steps S200-S204, and the catalyst deterioration diagnosis process is performed by the process routine of the steps S104-S110 in FIG. 8.

Figure 10A:
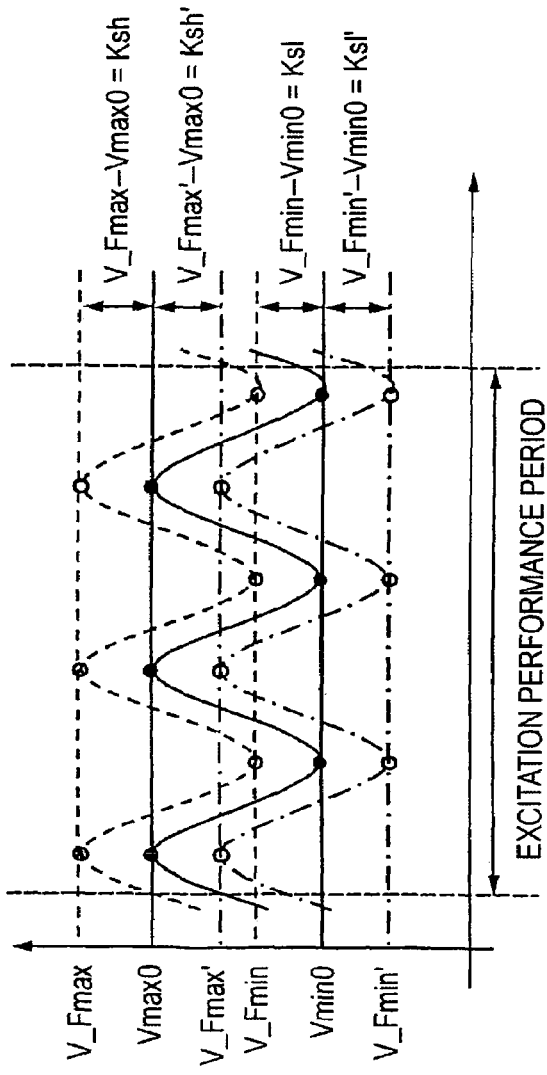
FIGS. 10A and 10B are graphs showing the relations between output waveforms and offset correction values in the case where $O_2$ sensor output characteristics have shifted, in Embodiment 3.
Figure 10B:
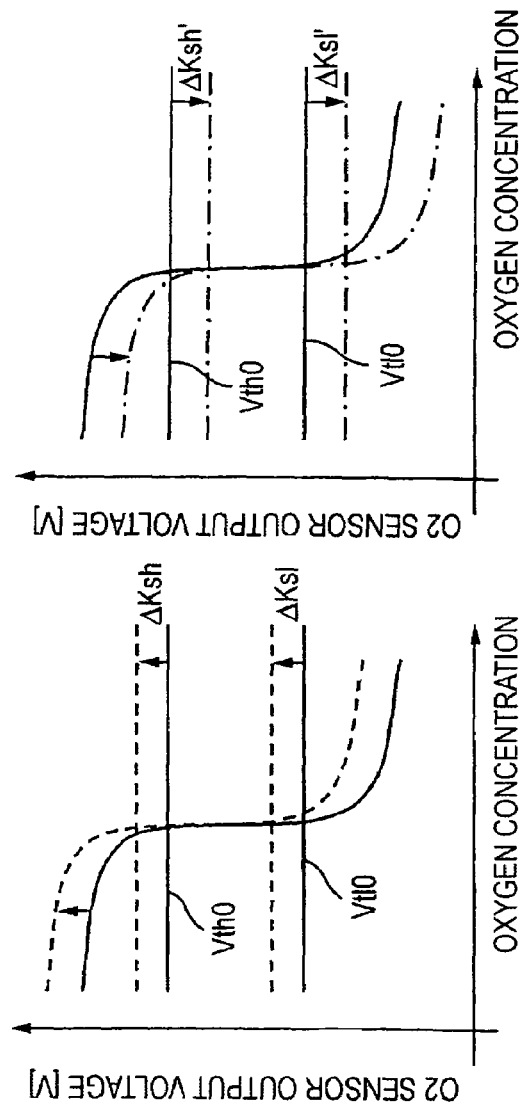

FIGS. 10A and 10B are graphs showing the relations of output waveforms and the offset correction values (Ksh, Ksl) in the case where the output characteristic of the $O_2$ sensor has shifted.

The operations of correcting the high-voltage-side/low-voltage-side decision levels with the offset correction values will be detailed with reference to FIGS. 10A and 10B.

A solid-line waveform in FIG. 10A indicates the output of the upstream-side $O_2$ sensor as is a reference during the performance of the excitation control. The mean value Vmax0 of the maximum voltages and the mean value Vmin0 of the minimum voltages of respective rich/lean inversions in the reference output of the upstream-side $O_2$ sensor during the performance of the excitation control are previously set as the reference values of the maximum-voltage mean value and minimum-voltage mean value, respectively.

A waveform in a broken line or a dot-and-dash line in FIG. 10A indicates the actually-measured upstream-side $O_2$ sensor output during the performance of the excitation control. Using the mean value V_Fmax (or V_Fmax') of the maximum voltages and the mean value V_Fmin (or V_Fmin') of the minimum voltages of respective rich/lean inversions in the actually-measured upstream-side $O_2$ sensor output during the performance of the excitation control, the offset correction values Ksh and Ksl (or Ksh' and Ksl') are calculated as deviations from the reference values on the maximum voltage side and minimum voltage side, respectively.

The offset correction values Ksh and Ksl (or Ksh' and Ksl') are regarded as the offset components of the upstream-side $O_2$ sensor output in an actual measurement state (a broken line or dot-and-dash line in FIG. 10B), relative to the upstream-side $O_2$ sensor output serving as a reference (a solid line in FIG. 10B). These offset correction values Ksh and Ksl (or Ksh' and Ksl') are respectively added to the high-voltage-side decision level Vth0 and low-voltage-side decision level Vtl0 previously set for the reference upstream-side $O_2$-sensor output characteristic, whereby the corrections of the high-voltage-side decision level Vth0 and low-voltage-side decision level Vtl0 are made.

Thus, the influence of the offset of the output characteristic attributed to the deterioration of the catalyst is compensated for the upstream-side $O_2$ sensor 8 which is susceptible to the influence of heat or sulfur poisoning on account of the direct impingement of the exhaust gas, and it is permitted to obtain a more accurate post-correction output VC, so that the precision of the catalyst deterioration diagnosis can be enhanced.

Incidentally, at the step S502 in FIG. 9, the high-voltage-side decision level Vth_F and low-voltage-side decision level Vtl_F have been calculated by correcting the high-voltage/low-voltage-side decision levels with the respective offset correction values Ksh and Ksl, but the decision levels may well be calculated as Vth_F=Vth0+Ks and Vtl_F=Vtl0+Ks by using the mean value Ks of the offset correction values Ksh and Ksl.

As thus far described, the catalyst deterioration diagnosis apparatus for an internal combustion engine according to this embodiment comprises means 16 for calculating the offset correction values of an $O_2$-sensor output characteristic, and means for interrupting the deterioration diagnosis of a catalyst when a calculation process for the offset correction values by the offset-correction-value calculation means 16 is not completed yet, wherein weighted correction process means 17 executes a weighted correction process after having corrected the output level decision zone of the signal of the upstream-side $O_2$ sensor 8 on the basis of the offset correction values calculated by the offset-correction-value calculation means 16.

Thus, the influence of the offset of the output characteristic attributed to the deterioration of the catalyst is compensated for the upstream-side $O_2$ sensor 8 which is susceptible to the influence of heat or sulfur poisoning, and a more accurate post-correction output VC can be obtained, so that the precision of the catalyst deterioration diagnosis can be enhanced still more.

EMBODIMENT 4

Figure 11:
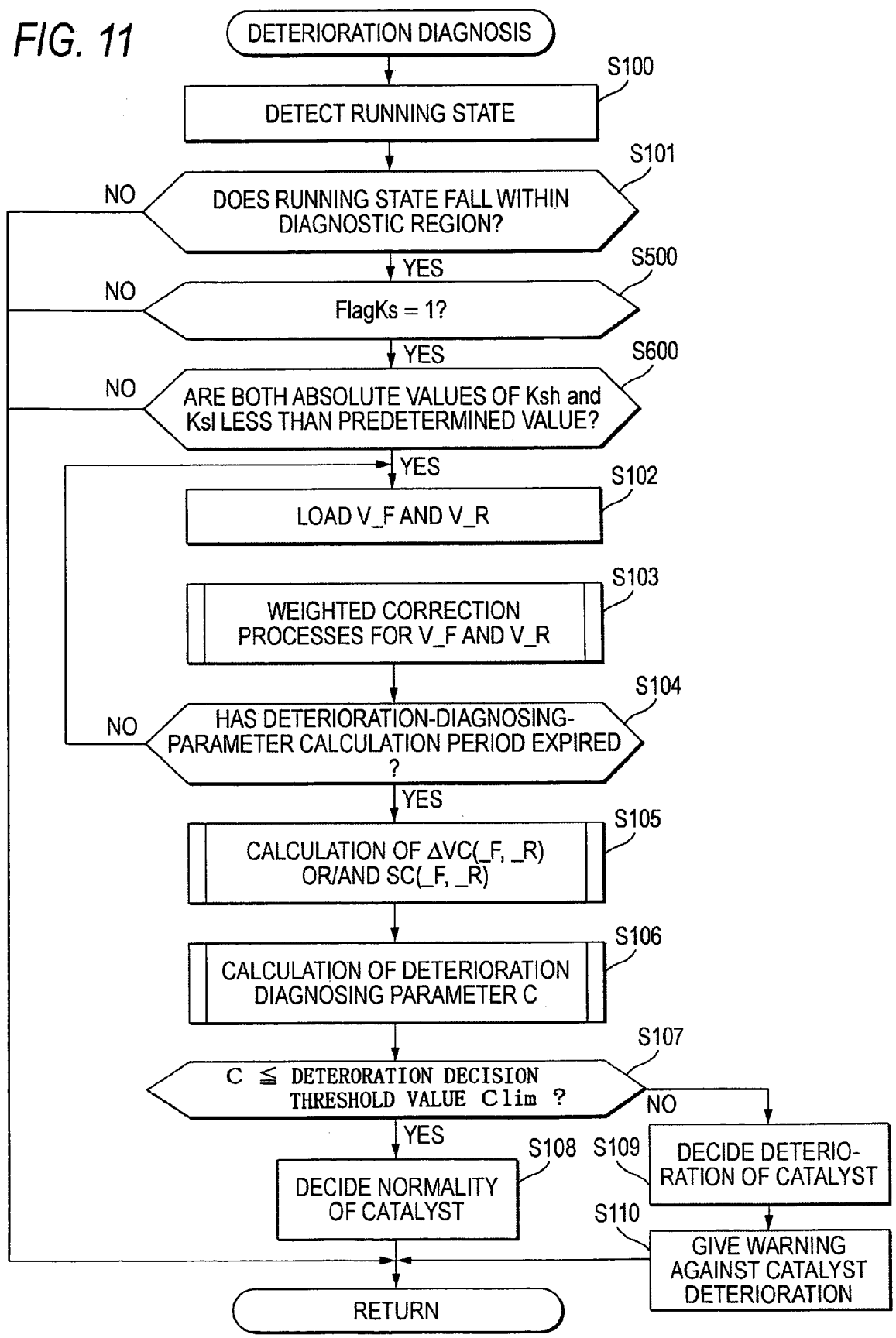
FIG. 11 is a flow chart showing a catalyst deterioration diagnosing operation in Embodiment 4.

FIG. 11 is a flow chart showing a deterioration diagnosis operation for a catalyst in a catalyst deterioration diagnosis apparatus for an internal combustion engine according to Embodiment 4.

Figure 12:
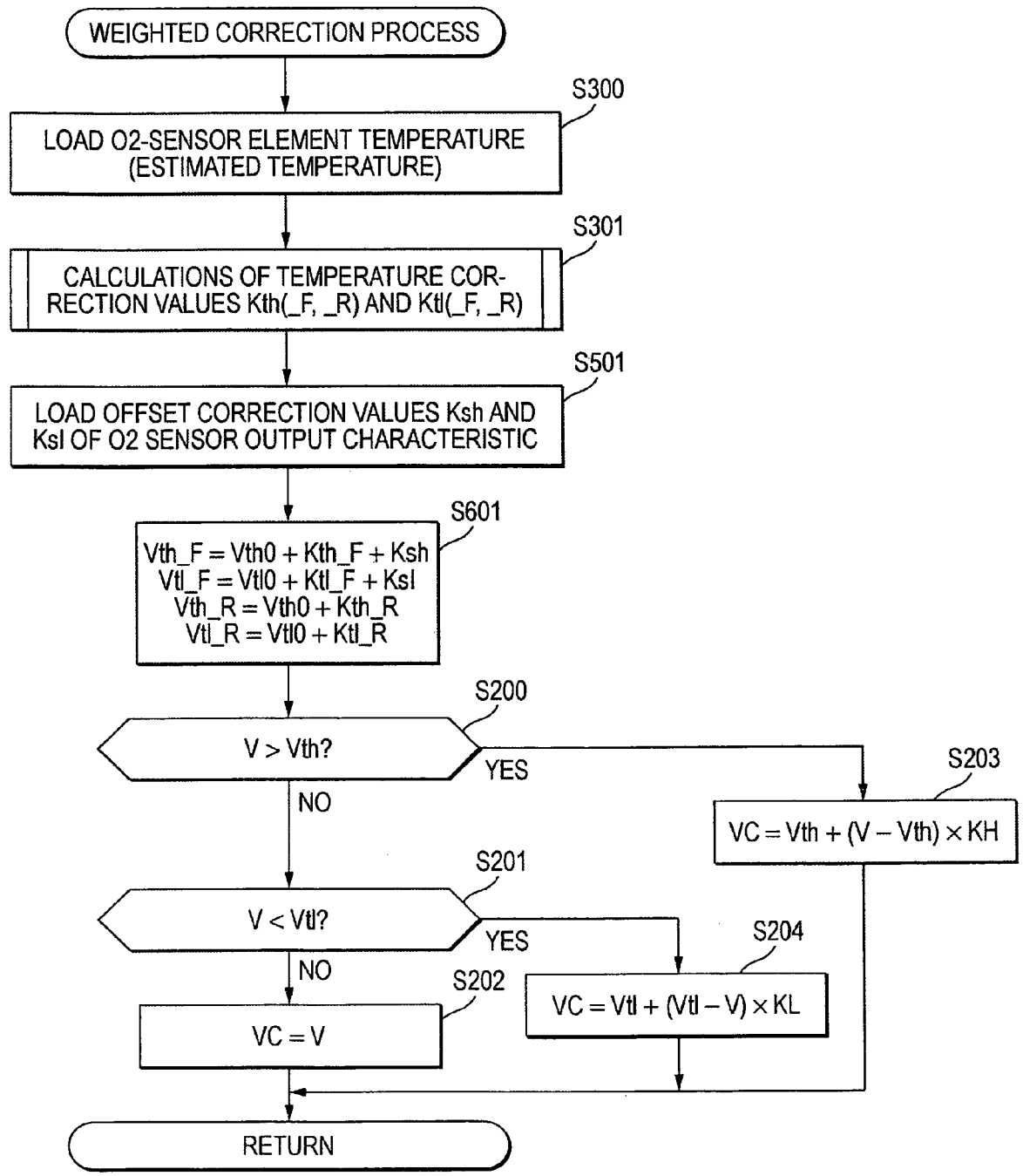
FIG. 12 is a flow chart showing a weighted correction process routine in Embodiment 4.
Figure 13A:
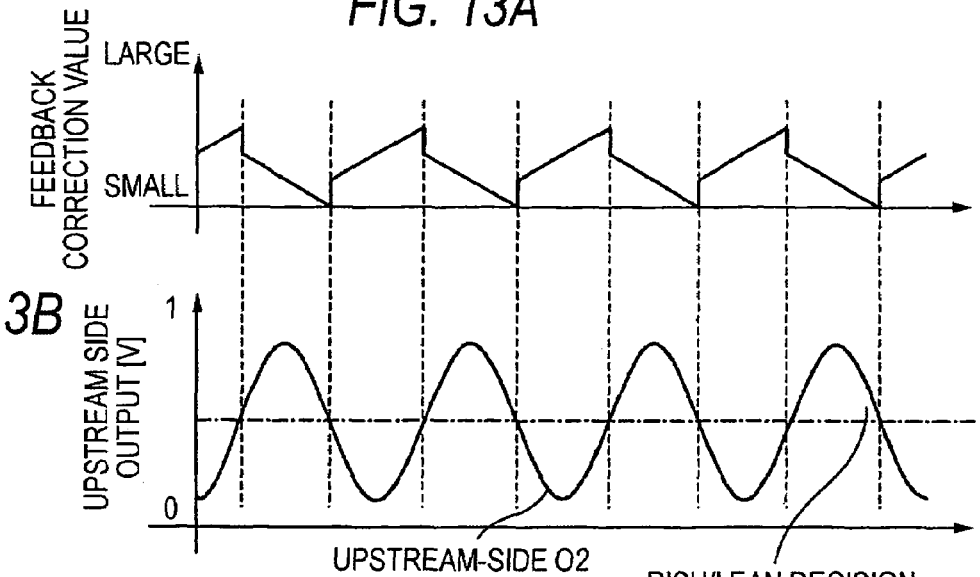
Figure 13A:
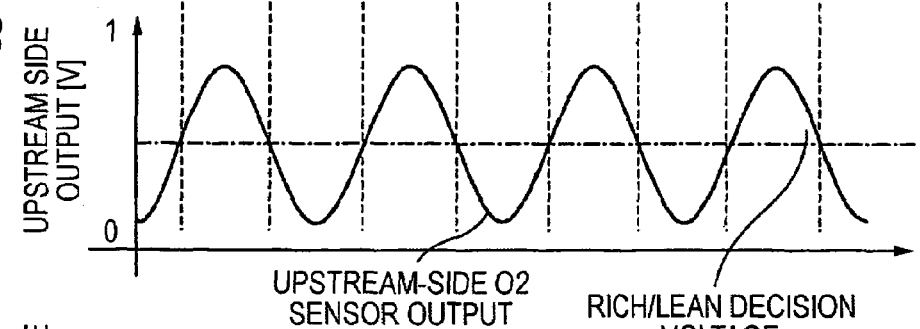
Figure 13A:
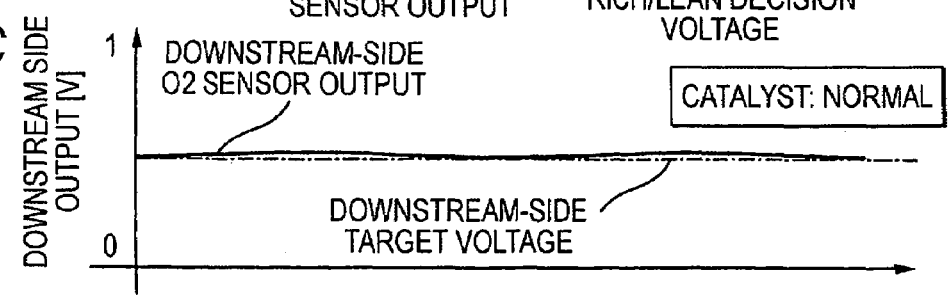
Figure 13A:
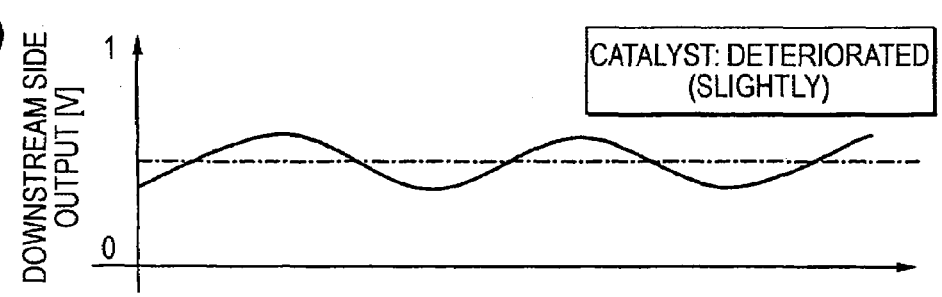
Figure 13A:
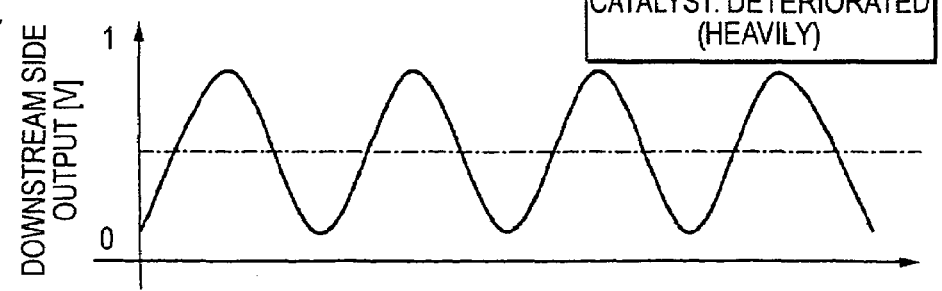

Besides, FIG. 12 is a flow chart showing a weighted correction process routine in the catalyst deterioration diagnosis apparatus for the internal combustion engine according to Embodiment 4.

Now, Embodiment 4 will be described with reference to the flow charts of FIGS. 11 and 12.

In FIG. 11 showing the catalyst deterioration diagnosing operation in this embodiment, the processing of a step S600 is added to FIG. 8 showing the catalyst deterioration diagnosis process routine of Embodiment 3.

Incidentally, it is assumed that the operation of the offset-correction-value calculation means 16 (refer to FIG. 1) has been completed by the process routine shown in FIG. 7, in the same manner as in Embodiment 3.

That is, the offset-correction-value calculation process completion flag FlagKs has been set to "1", and the offset-correction-value calculation process has been returned.

At the step S600, it is decided whether or not both the absolute values of the offset correction values Ksh and Ksl calculated by the offset-correction-value calculation means 16 beforehand are less than a predetermined value.

If it is decided at the step S600 that either of the absolute values of the offset correction values Ksh and Ksl is equal to or greater than the predetermined value (that is, the decided result of the step S600 is "NO"), the upstream-side $O_2$-sensor output characteristic is regarded as being abnormally offset, and the deterioration diagnosis process in FIG. 11 is ended and returned.

In contrast, if it is decided that both the absolute values of the offset correction values Ksh and Ksl are less than the predetermined value (that is, the decided result is "YES"), the routine proceeds to the processing of the step S102, et seq., and the catalyst deterioration diagnosis process is continued.

Here, the decision at the step S600 may be made with only one of the offset correction values Ksh and Ksl, or it may well be made using the mean value Ks of the offset correction values Ksh and Ksl.

Next, in the weighted correction process means 17, a weighted correction process is performed by the process routine shown in the flow chart of FIG. 12.

Here, the processing of steps S300 and S301 for calculating temperature correction values as in Embodiment 2 is added to FIG. 9 showing the weighted correction process routine in Embodiment 3.

Besides, at a step S601, high-output decision levels Vth_F and Vth_R and low-output decision levels Vtl_F and Vtl_R are calculated as post-correction values for the upstream side and the downstream side, on the basis of the temperature correction values (Kth_F, Kth_R, Ktl_F and Ktl_R) and the offset correction values (Ksh and Ksl).

Thenceforth, as in any of Embodiments 1-3, the weighted correction process is performed by the process routine of the steps S200-S204, and the catalyst deterioration diagnosis process is performed by the process routine of the steps S104-S110 in FIG. 11.

As thus far described, in this embodiment, the catalyst deterioration diagnosis process is interrupted in the case where the offset correction value is not less than the predetermined value. It is therefore possible to avoid the risk of an erroneous diagnosis in the case where the upstream-side $O_2$-sensor output characteristic is greatly offset under the influence of the catalyst deterioration, or the like, and where the deviation thereof from the downstream-side $O_2$-sensor output characteristic has become extraordinarily great.

Besides, the deterioration diagnosis of the catalyst can be made more accurately by combining the temperature correction process based on the $O_2$-sensor element temperature in Embodiment 2 and the offset correction process including the offset-correction-value calculation process in Embodiment 3.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A catalyst deterioration diagnosis apparatus comprising:
    a catalyst converter interposed in an exhaust passage of an internal combustion engine;
    an upstream-side O2 sensor disposed in an upstream of the catalyst converter;
    a downstream-side O2 sensor disposed in a downstream of the catalyst converter;
    a running-state detection unit which detects a running state of the internal combustion engine which includes an engine revolution number and load information;
    weighted correction process unit which subjects an output signal of the upstream-side O2 sensor and an output signal of the downstream-side O2 sensor to weighted correction processes corresponding to output levels, when the weighted correction process unit has determined on the basis of the running state information that the running state falls within a catalyst deterioration diagnosis performance region previously set;
    calculation unit which calculates at least one of amplitude magnitudes and time integral value, the amplitude magnitudes are amplitude magnitudes of the output signal of the upstream-side O2 sensor and the output signal of the downstream-side O2 sensor after the weighted correction processes, and the time integral values are time integral values of a difference between a first predetermined signal and the output signal of the upstream-side O2 sensor after the weighted correction processes and of a difference between a second predetermined signal and the output signal of the downstream-side O2 sensor after the weighted correction processes;
    deterioration-diagnosing-parameter calculation unit which calculates a deterioration diagnosing parameter on the basis of a combination or either of the amplitude magnitudes and the time integral values calculated by the calculation unit;
    deterioration decision unit which determines a deterioration of the catalyst converter on the basis of a result of a comparison between a predetermined deterioration decision threshold value and the deterioration diagnosing parameter calculated by the deterioration-diagnosing-parameter calculation unit; and
    warning unit which issues a warning when the deterioration decision unit has detected and has determined that the catalyst converter has been deteriorated.

2. The catalyst deterioration diagnosis apparatus of claim 1, further comprising:
    a basic-injection-quantity setting unit which sets a basic fuel injection quantity in accordance with the running state information from the running-state detection unit;
    a feedback control unit which executes a feedback control on the basis of the output signal of the upstream-side O2 sensor and which corrects the feedback control on the basis of the output signal of the downstream-side O2 sensor; and
    a fuel-injection-quantity correction unit which corrects the basic fuel injection quantity in accordance with a control magnitude based on the feedback control.

3. A catalyst deterioration diagnosis apparatus for an internal combustion engine as has a catalyst converter which is interposed in an exhaust passage of the internal combustion engine, an upstream-side O2 sensor which is disposed in an upstream of the catalyst converter, a downstream-side O2 sensor which is disposed in a downstream of the catalyst converter, running-state detection means for detecting that running state of the internal combustion engine which includes an engine revolution number and load information, basic-injection-quantity setting means for setting a basic fuel injection quantity in accordance with the running state information from the running-state detection means, feedback control means for executing a feedback control on the basis of a signal of the upstream-side O2 sensor and for correcting the feedback control on the basis of a signal of the downstream-side O2 sensor, and fuel-injection-quantity correction means for correcting the basic fuel injection quantity in accordance with a control magnitude based on the feedback control, comprising:

weighted correction process means for subjecting the output signal of said upstream-side O2 sensor and the output signal of said downstream-side O2 sensor to weighted correction processes corresponding to output levels, when it has been decided on the basis of the running state information that the running state falls within a catalyst deterioration diagnosis performance region previously set;

calculation means for calculating both or either of amplitude magnitudes of the output signal of said upstream-side O2 sensor and the output signal of said downstream-side O2 sensor after the weighted correction processes, and time integral values of differences between predetermined signals and the output signal of said upstream-side O2 sensor and the output signal of said downstream-side O2 sensor after the weighted correction processes;

deterioration-diagnosing-parameter calculation means for calculating a deterioration diagnosing parameter on the basis of a combination or either of the amplitude magnitudes and the time integral values calculated by said calculation means;

deterioration decision means for deciding deterioration of said catalyst converter on the basis of a result of a comparison between a predetermined deterioration decision threshold value and the deterioration diagnosing parameter calculated by said deterioration-diagnosing-parameter calculation means; and warning means for issuing warning when it has been decided by said deterioration decision means that said catalyst converter has been deteriorated.

4. A catalyst deterioration diagnosis apparatus for an internal combustion engine as defined in claim 3, wherein said weighted correction process means includes O2-sensor element temperature detection means for detecting or estimating an O2-sensor element temperature, and it executes the weighted correction processes after correcting output level decision zones of the signal of said upstream-side O2 sensor and the signal of said downstream-side O2 sensor, on the basis of the detected or estimated O2-sensor element temperature.

5. A catalyst deterioration diagnosis apparatus for an internal combustion engine as defined in claim 4, comprising:

means for calculating offset correction values of O2-sensor output characteristics, and means for interrupting the deterioration diagnosis of said catalyst converter when calculation processes of the offset correction values by the offset-correction-value calculation means have not been completed yet;

wherein said weighted correction process means executes the weighted correction process after correcting an output level decision zone of the signal of said upstream-side O2 sensor on the basis of the offset correction values calculated by said offset-correction-value calculation means.

6. A catalyst deterioration diagnosis apparatus for an internal combustion engine as defined in claim 5, wherein the deterioration diagnosis of said catalyst converter is interrupted in a case where at least one of the offset correction values calculated by said offset-correction-value calculation means is not less than a predetermined value.

7. A catalyst deterioration diagnosis apparatus for an internal combustion engine as defined in claim 3, comprising:

means for calculating offset correction values of O2-sensor output characteristics, and means for interrupting the deterioration diagnosis of said catalyst converter when calculation processes of the offset correction values by the offset-correction-value calculation means have not been completed yet;

wherein said weighted correction process means executes the weighted correction process after correcting an output level decision zone of the signal of said upstream-side O2 sensor on the basis of the offset correction values calculated by said offset-correction-value calculation means.

8. A catalyst deterioration diagnosis apparatus for an internal combustion engine as defined in claim 7, wherein the deterioration diagnosis of said catalyst converter is interrupted in a case where at least one of the offset correction values calculated by said offset-correction-value calculation means is not less than a predetermined value.

9. A catalyst deterioration diagnosis apparatus for an internal combustion engine as defined in claim 3, wherein the correction process means determines whether the output signal (V) of each of said upstream-side O2 sensor and said downstream-side O2 sensor is greater than a preset high-output-side decision level (Vth), less than a preset low-output-side decision level (Vtl), or neither greater than the preset high-output-side decision level (Vth) or less than the preset low-output-side decision level.

10. A catalyst deterioration diagnosis apparatus for an internal combustion engine as defined in claim 9, wherein the correction process means calculates a post-weight-correction output (VC) corresponding to each output signal (V) of said upstream-side O2 sensor and said downstream-side O2 sensor such that:

when the output signal (V) is greater than the preset high-output-side decision level (Vth), $$VC=Vth+(V-Vth)KH$$

when the output signal (V) is less than the preset low-output-side decision level (Vtl), $$VC=Vtl+(Vtl-V)KL$$

and when the output signal (V) is neither greater than the preset high-output-side decision level (Vth) or less than the preset low-output-side decision level, $$VC=V$$

where $KH=1/(SLh/SLm)$ and $KL=1/(SLl/SLm)$, where SLh, SLm and SLl are each a gradient of the output signal (V) versus an oxygen concentration in a corresponding region divided by the decision levels Vth and Vtl, such that SLh corresponds to a region greater than decision level Vth, SLl corresponds to a region less than decision level Vtl, and SLm corresponds to a region between decision levels Vth and Vtl.

11. A catalyst deterioration diagnosis apparatus for an internal combustion engine as defined in claim 9, wherein the calculation means calculates both or either the amplitude magnitudes of each post-weight-correction output and the time integral values of each post-weight-correction output by calculating an area equivalent value of a pattern enclosed with the post-weight-correction output and the predetermined signal.

12. A catalyst deterioration diagnosis apparatus for an internal combustion engine as defined in claim 11, wherein the predetermined signal is a voltage level previously set and in a vicinity of an amplitude center of the output signal of the respective upstream-side O2 sensor and downstream-side O2 sensor.

13. A catalyst deterioration diagnosis apparatus for an internal combustion engine as defined in claim 12, wherein the deterioration diagnosing parameter (C) is calculated as an amplitude ratio, an area equivalent value ratio, or a value obtained by combining the amplitude ratio and the area equivalent value ratio of the output signals of said upstream-side O2 sensor and said downstream-side O2 sensor, such that, the amplitude ratio=$\Delta VCR/\Delta VCF$
the area equivalent value ratio=$SCR/SCF$
wherein $\Delta VCF$ and $\Delta VCR$ are the amplitude magnitudes for said upstream-side O2 sensor and said downstream-side O2 sensor, respectively, and SCF and SCR are the time integral values of said upstream-side O2 sensor and said downstream-side O2 sensor, respectively.

14. A catalyst deterioration diagnosis apparatus for an internal combustion engine as defined in claim 13, wherein said deterioration decision means determines that said catalyst converter is normal when the deterioration diagnosing parameter is equal to or less than the predetermined deterioration decision threshold value, and determines that said catalyst converter is deteriorated when the deterioration diagnosing parameter is greater than the predetermined deterioration decision threshold value.

15. A catalyst deterioration diagnosis method for an internal combustion engine as has a catalyst converter which is interposed in an exhaust passage of the internal combustion engine, an upstream-side O2 sensor which is disposed in an upstream of the catalyst converter, a downstream-side O2 sensor which is disposed in a downstream of the catalyst converter, running-state detection means for detecting that running state of the internal combustion engine which includes an engine revolution number and load information, basic-injection-quantity setting means for setting a basic fuel injection quantity in accordance with the running state information from the running-state detection means, feedback control means for executing a feedback control on the basis of a signal of the upstream-side O2 sensor and for correcting the feedback control on the basis of a signal of the downstream-side O2 sensor, and fuel-injection-quantity correction means for correcting the basic fuel injection quantity in accordance with a control magnitude based on the feedback control, comprising:

a weighted correction process step of subjecting the output signal of the upstream-side O2 sensor and the output signal of the downstream-side O2 sensor to weighted correction processes corresponding to output levels, when it has been decided on the basis of the running state information that the running state falls within a catalyst deterioration diagnosis performance region previously set;

a calculation step of calculating both or either of amplitude magnitudes of the output signal of the upstream-side O2 sensor and the output signal of the downstream-side O2 sensor after the weighted correction processes, and time integral values of differences between predetermined signals and the output signal of the upstream-side O2 sensor and the output signal of the downstream-side O2 sensor after the weighted correction processes;

a deterioration-diagnosing-parameter calculation step of calculating a deterioration diagnosing parameter on the basis of a combination or either of the amplitude magnitudes and the time integral values calculated at said calculation step;

a deterioration decision step of deciding deterioration of the catalyst converter on the basis of a result of a comparison between a predetermined deterioration decision threshold value and the deterioration diagnosing parameter calculated at said deterioration-diagnosing-parameter calculation step; and a warning step of issuing warning when it has been decided at said deterioration decision step that the catalyst converter has been deteriorated.

16. A catalyst deterioration diagnosis method for an internal combustion engine as defined in claim 15, wherein said weighted correction process step includes an O2-sensor element temperature detection step of detecting or estimating an O2-sensor element temperature, and it executes the weighted correction processes after correcting output level decision zones of the signal of the upstream-side O2 sensor and the signal of the downstream-side O2 sensor, on the basis of the detected or estimated O2-sensor element temperature.

17. A catalyst deterioration diagnosis method for an internal combustion engine as defined in claim 16, comprising:

a step of calculating offset correction values of O2-sensor output characteristics, and a step of interrupting the deterioration diagnosis of the catalyst converter when calculation processes of the offset correction values at the offset-correction-value calculation step have not been completed yet;

wherein said weighted correction process step executes the weighted correction process after correcting an output level decision zone of the signal of the upstream-side O2 sensor on the basis of the offset correction values calculated at said offset-correction-value calculation step.

18. A catalyst deterioration diagnosis method for an internal combustion engine as defined in claim 17, wherein the deterioration diagnosis of the catalyst converter is interrupted in a case where at least one of the offset correction values calculated at said offset-correction-value calculation step is not less than a predetermined value.

19. A catalyst deterioration diagnosis method for an internal combustion engine as defined in claim 15, comprising:

a step of calculating offset correction values of O2-sensor output characteristics, and a step of interrupting the deterioration diagnosis of the catalyst converter when calculation processes of the offset correction values at the offset-correction-value calculation step have not been completed yet;

wherein said weighted correction process step executes the weighted correction process after correcting an output level decision zone of the signal of the upstream-side O2 sensor on the basis of the offset correction values calculated at said offset-correction-value calculation step.

20. A catalyst deterioration diagnosis method for an internal combustion engine as defined in claim 19, wherein the deterioration diagnosis of the catalyst converter is interrupted in a case where at least one of the offset correction values calculated at said offset-correction-value calculation step is not less than a predetermined value.

* * * * *